(12) United States Patent  
Iwamura et al.

(10) Patent No.: US 9,378,429 B2  
(45) Date of Patent: Jun. 28, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Yasumasa Iwamura, Akashi (JP); Akihiro Minagawa, Tachikawa (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/665,035

(22) Filed: Mar. 23, 2015

(65) Prior Publication Data

US 2015/0304618 A1    Oct. 22, 2015

(30) Foreign Application Priority Data

Apr. 18, 2014  (JP) ................. 2014-086258

(51) Int. Cl.
| | |
|---|---|
| H04N 9/64 | (2006.01) |
| G06K 9/46 | (2006.01) |
| G06T 7/40 | (2006.01) |
| G01J 3/46 | (2006.01) |
| H04N 1/60 | (2006.01) |
| H04N 9/73 | (2006.01) |
| G06K 9/32 | (2006.01) |

(52) U.S. Cl.
CPC ... *G06K 9/46* (2013.01); *G01J 3/46* (2013.01); *G06K 9/3216* (2013.01); *G06K 9/4652* (2013.01); *G06T 7/408* (2013.01); *H04N 1/60* (2013.01); *H04N 9/73* (2013.01)

(58) Field of Classification Search
CPC ........... G01J 3/46; G06K 9/3216; G06K 9/46; G06K 9/4652; H06T 7/408; H04N 1/60
See application file for complete search history.

(56) References Cited

U.S. PATENT DOCUMENTS

| | | | | |
|---|---|---|---|---|
| 2006/0238832 A1* | 10/2006 | Ohsawa | ................... | G09G 5/02 358/518 |
| 2006/0280360 A1* | 12/2006 | Holub | ....................... | G01J 3/02 382/162 |
| 2010/0321747 A1* | 12/2010 | Sakamoto | ................. | G01J 3/46 358/518 |
| 2013/0021628 A1* | 1/2013 | Nakamura | ........... | H04N 1/6052 358/1.9 |
| 2013/0135635 A1* | 5/2013 | Nakamura | ........... | H04N 1/6052 358/1.9 |
| 2013/0141611 A1* | 6/2013 | Hirai | ...................... | H04N 9/045 348/231.3 |
| 2014/0036284 A1* | 2/2014 | Matsuzaki | ............... | H04N 1/60 358/1.9 |
| 2014/0293091 A1* | 10/2014 | Rhoads | .................... | G01J 3/513 348/234 |
| 2015/0324993 A1* | 11/2015 | Stein | ..................... | G06T 7/0079 382/164 |

FOREIGN PATENT DOCUMENTS

| | | |
|---|---|---|
| JP | 2001-134252 | 5/2001 |
| JP | 2005-150779 | 6/2005 |

(Continued)

*Primary Examiner* — Amy Hsu  
(74) *Attorney, Agent, or Firm* — Fujitsu Patent Center

(57) ABSTRACT

A device includes a processor configured to execute a process including extracting a pixel value of each of a plurality of areas of a same color that are arranged at different positions on a color chart that is captured in an image, and specifying by using the extracted pixel values of the areas and arrangement positions of the areas of the same color an area that has a pixel value that corresponds to a function that expresses fluctuation of pixel values according to a position due to non-uniformity of an illumination environment that fluctuates the pixel values at a constant rate in one direction, and correcting a pixel value of a correction target area between the areas of the same color according to the pixel value of the specified area.

9 Claims, 27 Drawing Sheets

(56) References Cited

FOREIGN PATENT DOCUMENTS

| | | |
|---|---|---|
| JP | 2013-026921 | 2/2013 |
| JP | 2013-110696 | 6/2013 |
| JP | 2013-195243 | 9/2013 |
| JP | 2013-196373 | 9/2013 |

* cited by examiner

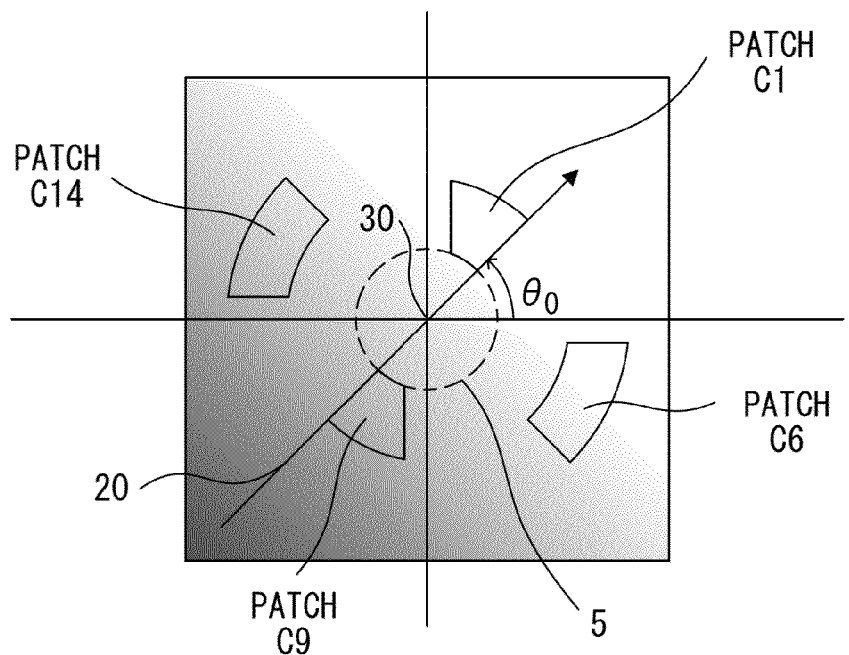
F I G. 5A
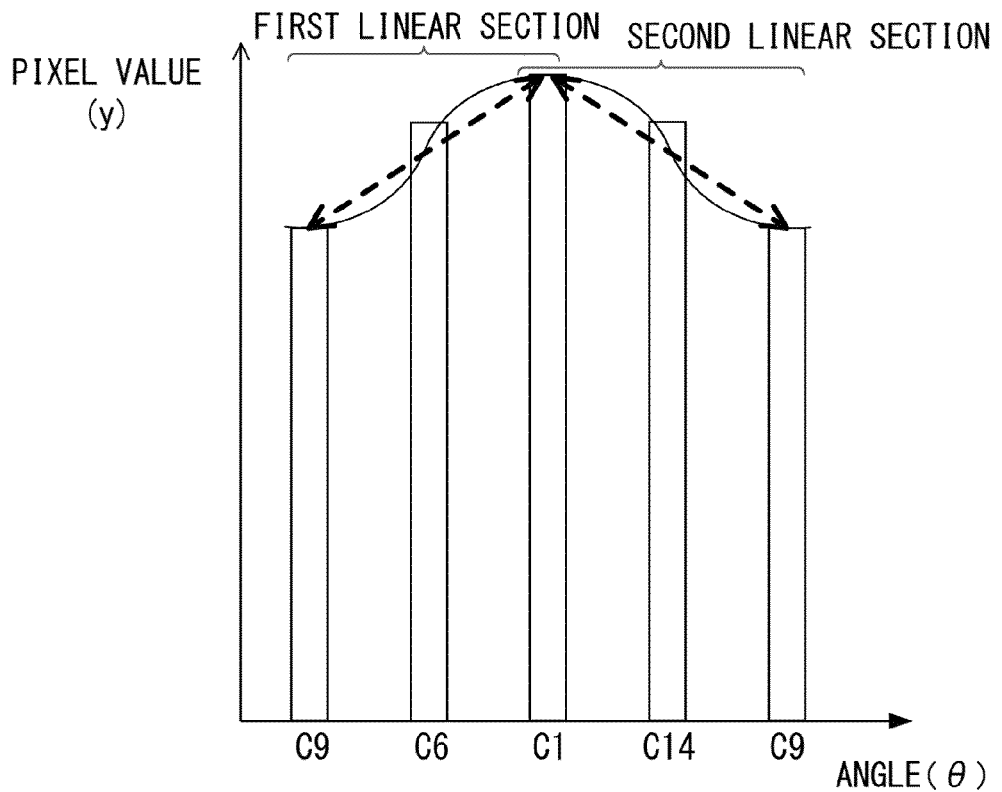
F I G. 5B

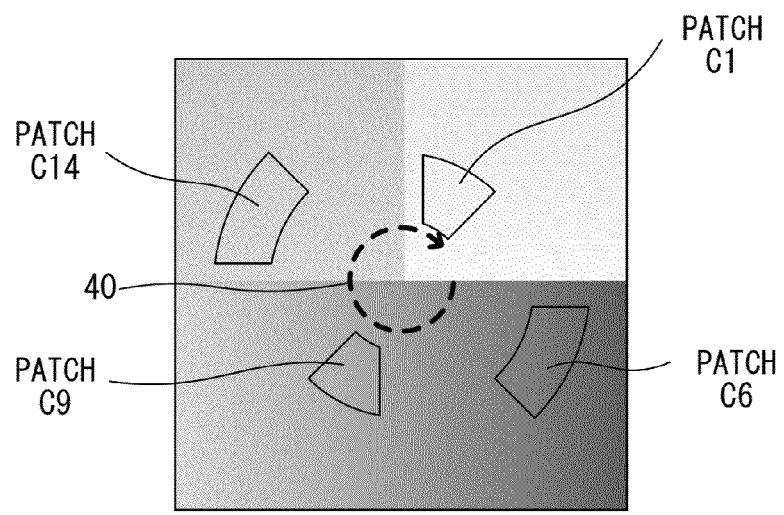
F I G. 6 A
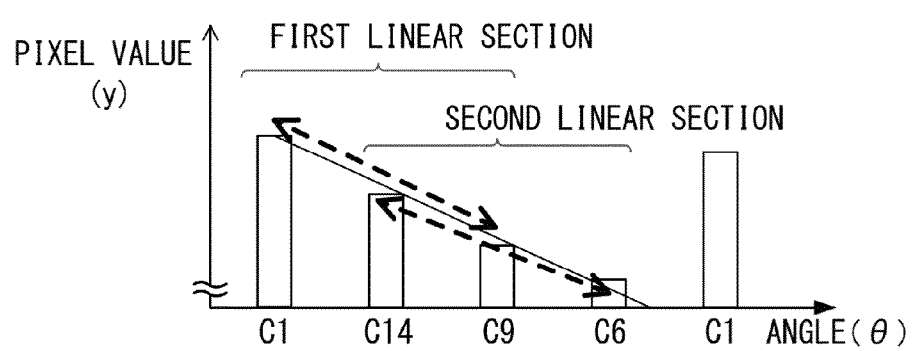
F I G. 6 B

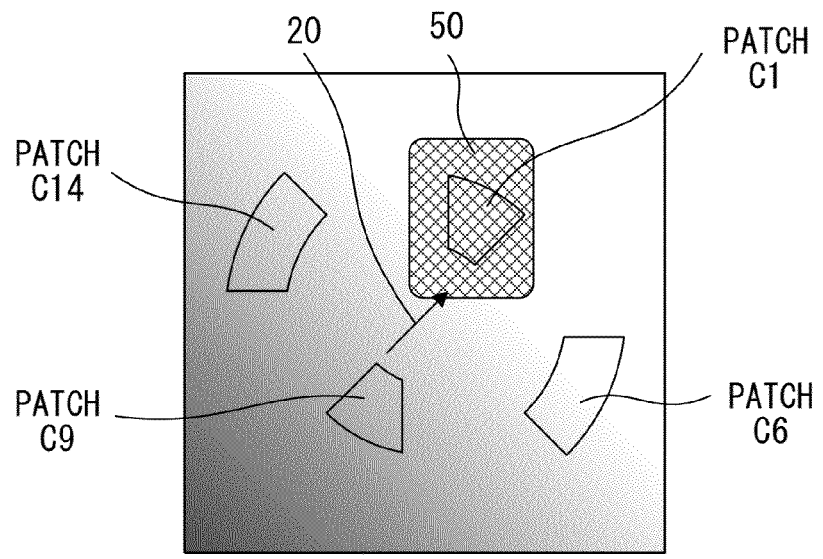
F I G. 7A
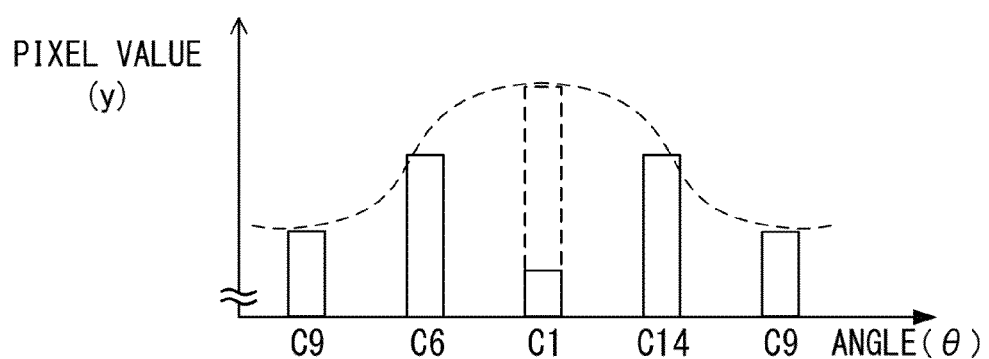
F I G. 7B

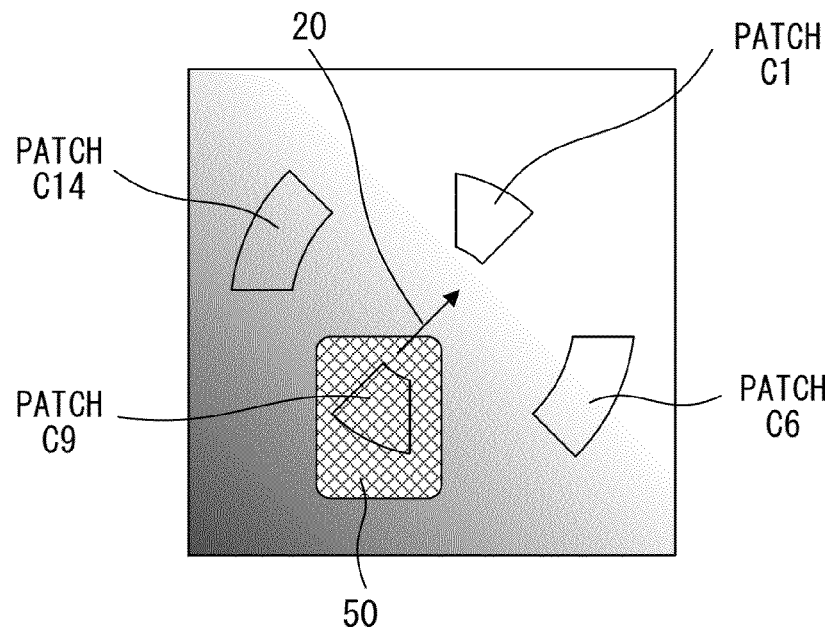
F I G. 8 A
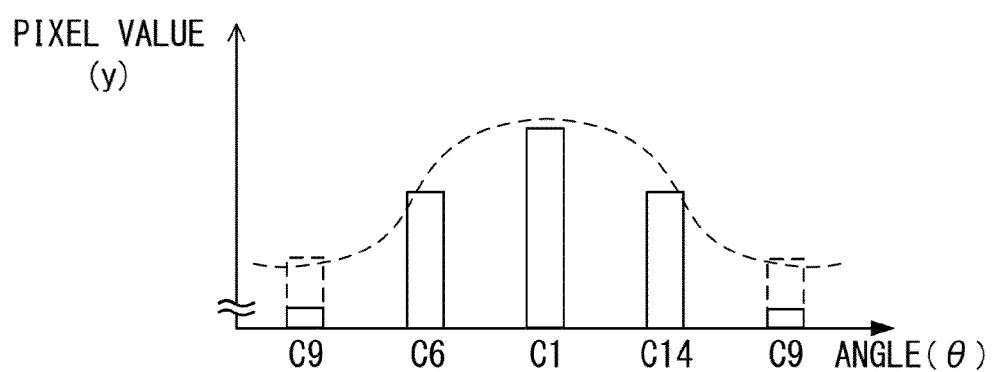
F I G. 8 B

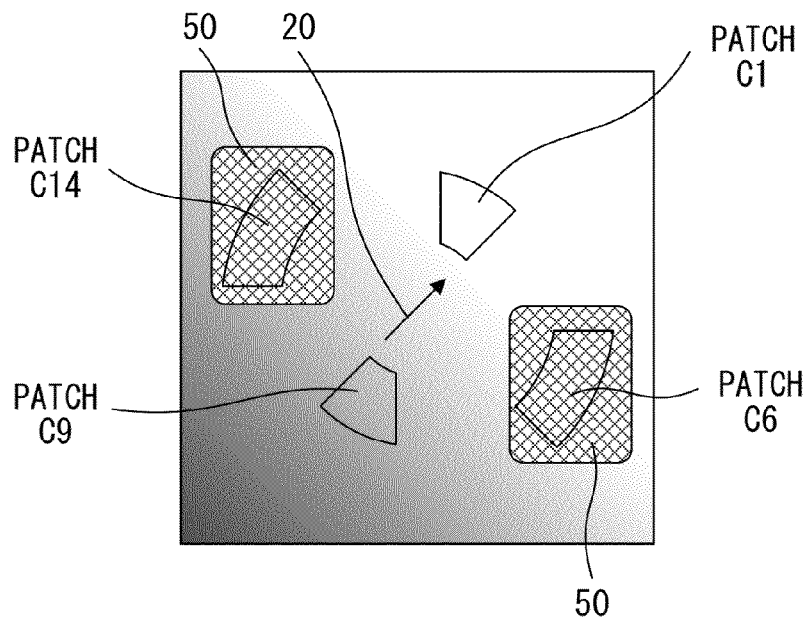
F I G. 1 0 A
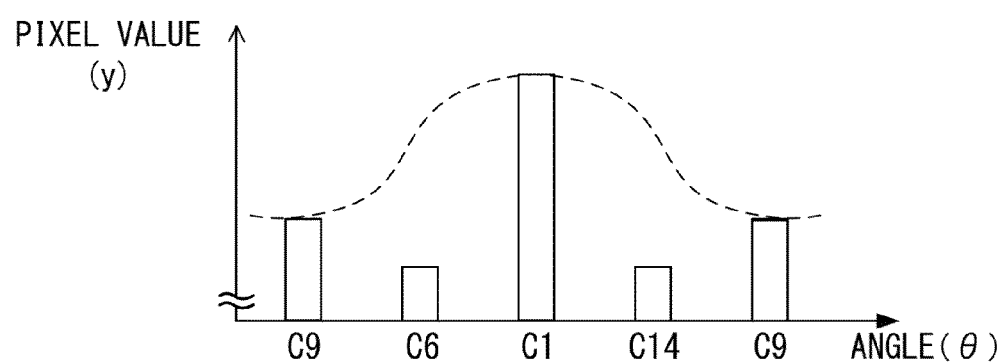
F I G. 1 0 B

| GROUP | NUMBER OF PATCHES | PATCH IDENTIFIER | | | |
|---|---|---|---|---|---|
| a | 4 | C1 | C6 | C9 | C14 |
| b | 4 | C2 | C5 | C10 | C13 |
| c | 4 | C3 | C8 | C11 | C16 |
| d | 4 | C4 | C7 | C12 | C15 |

1100

F I G. 1 1

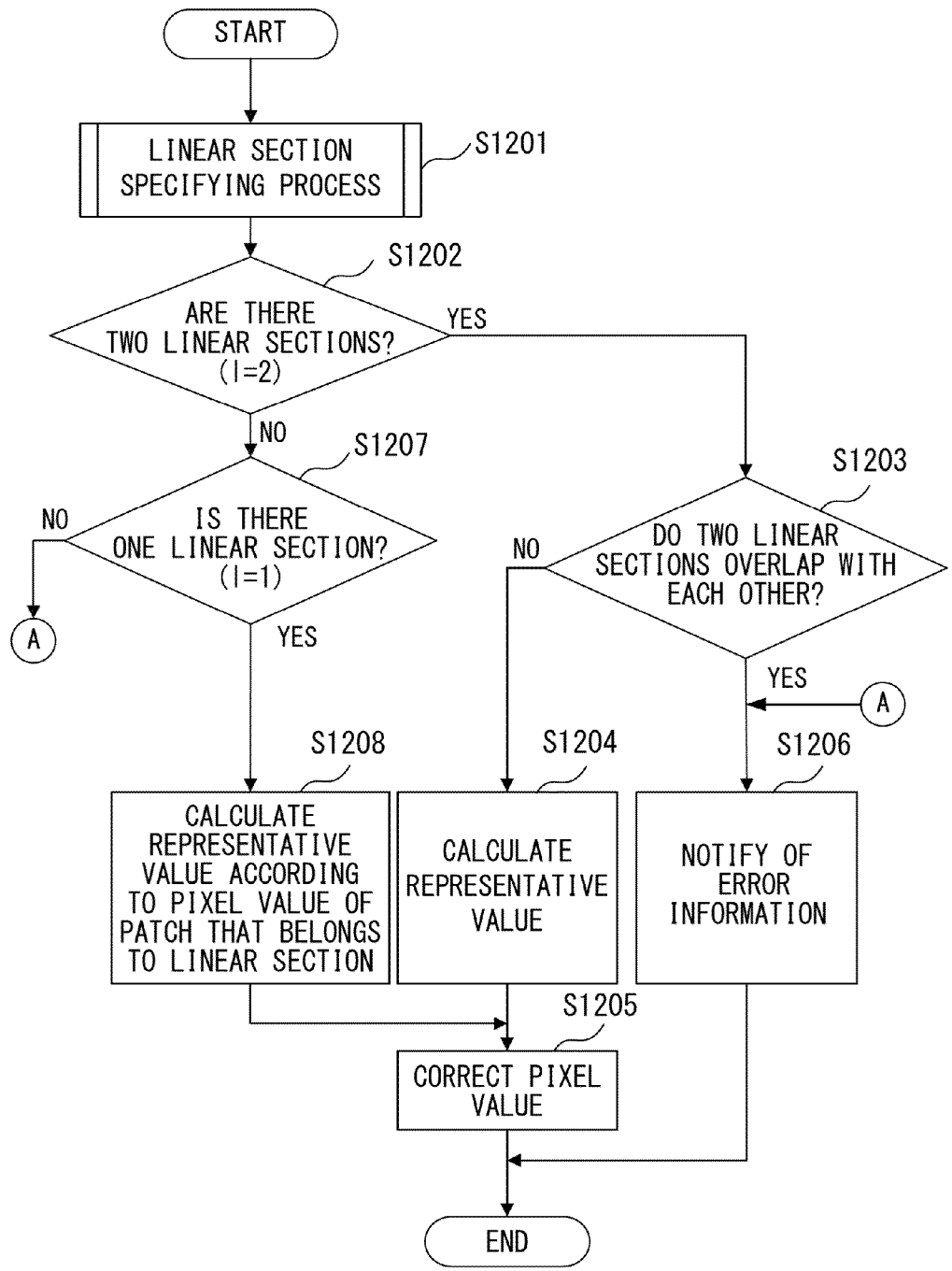
F I G. 1 2

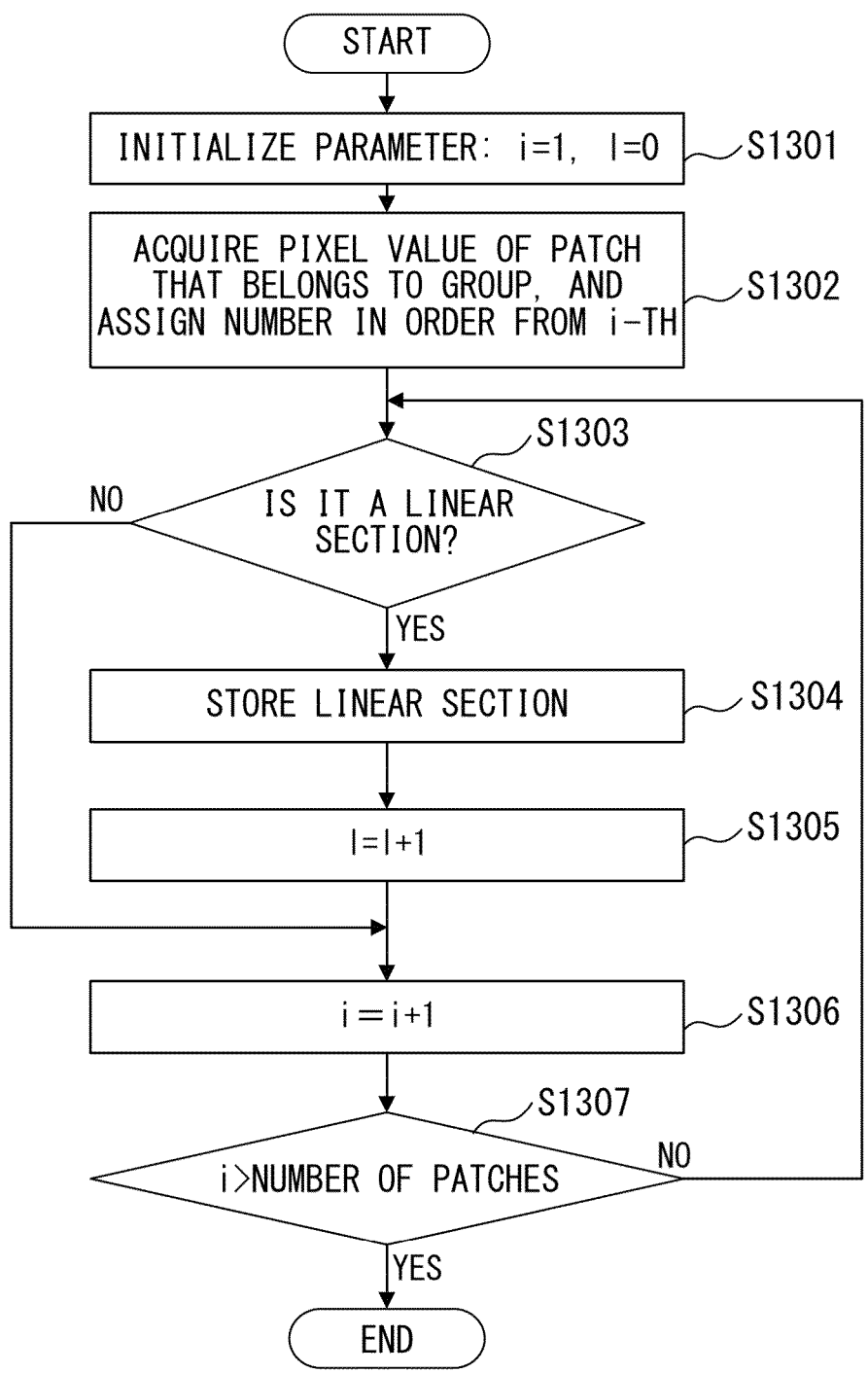
F I G. 13

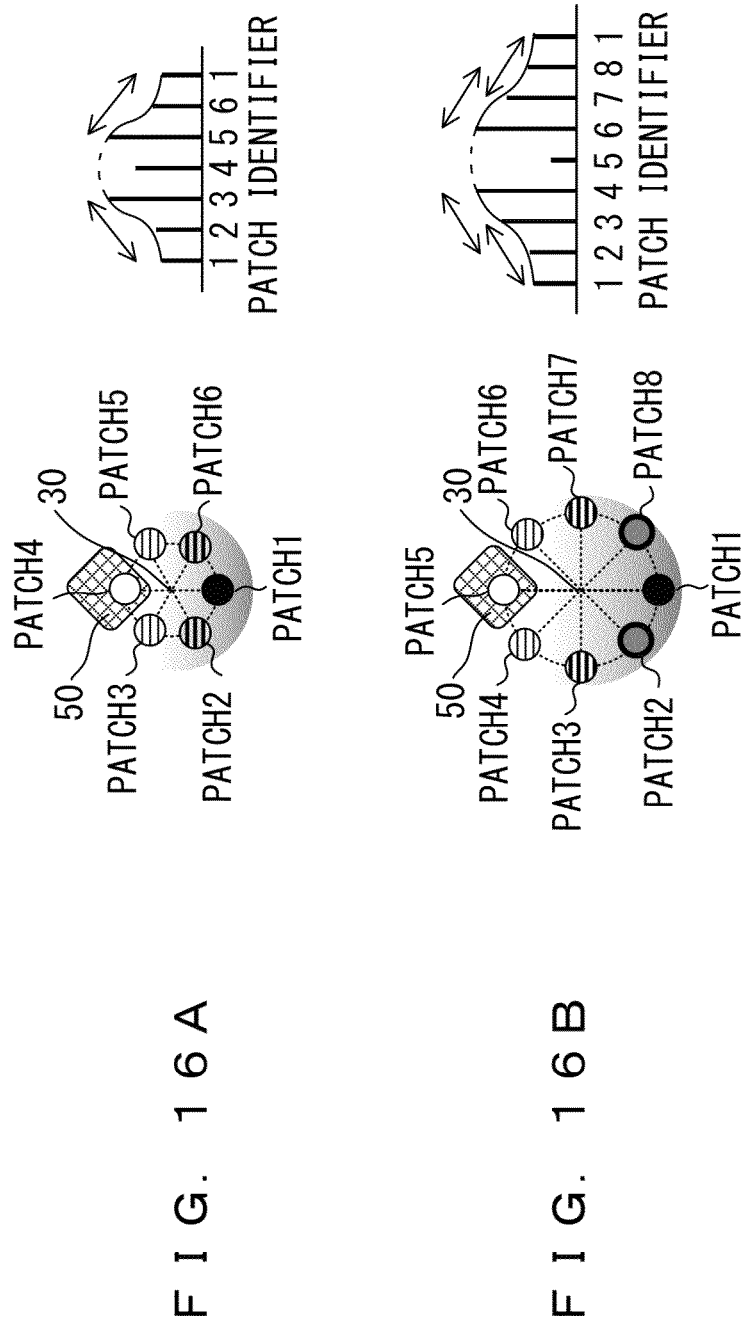

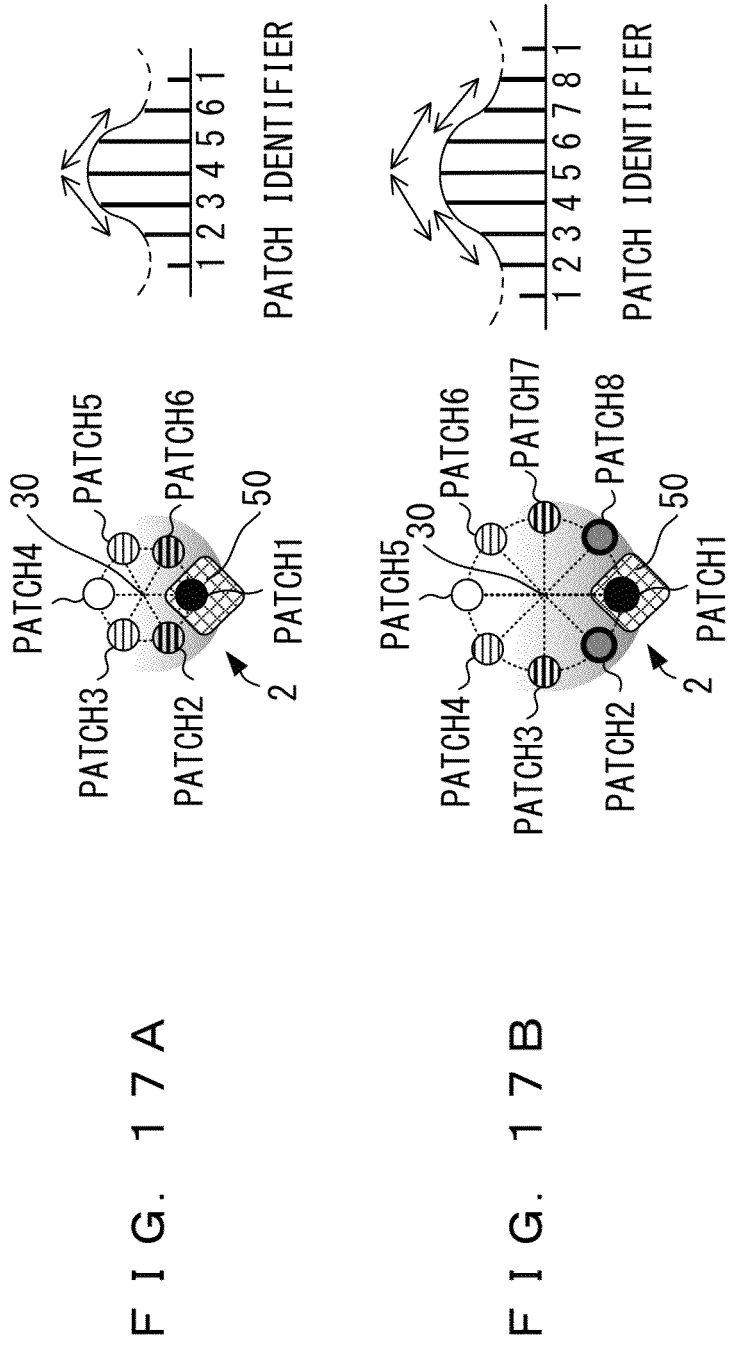

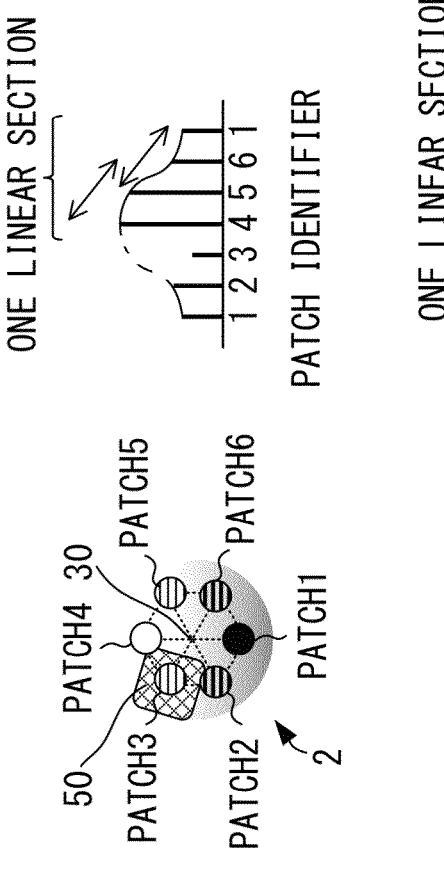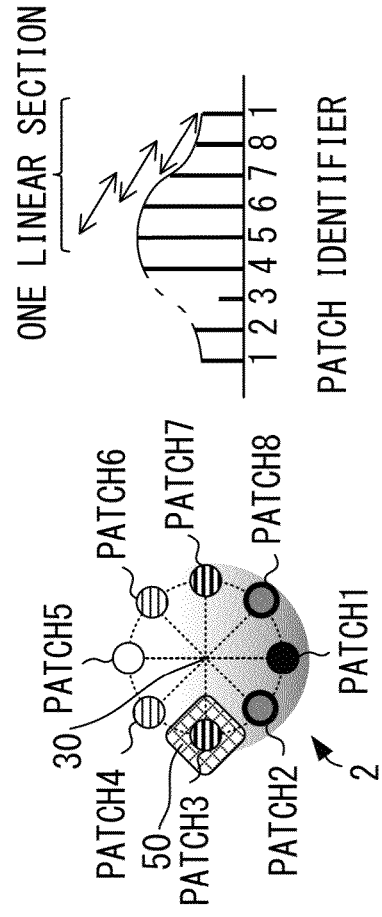
FIG. 18A
FIG. 18B

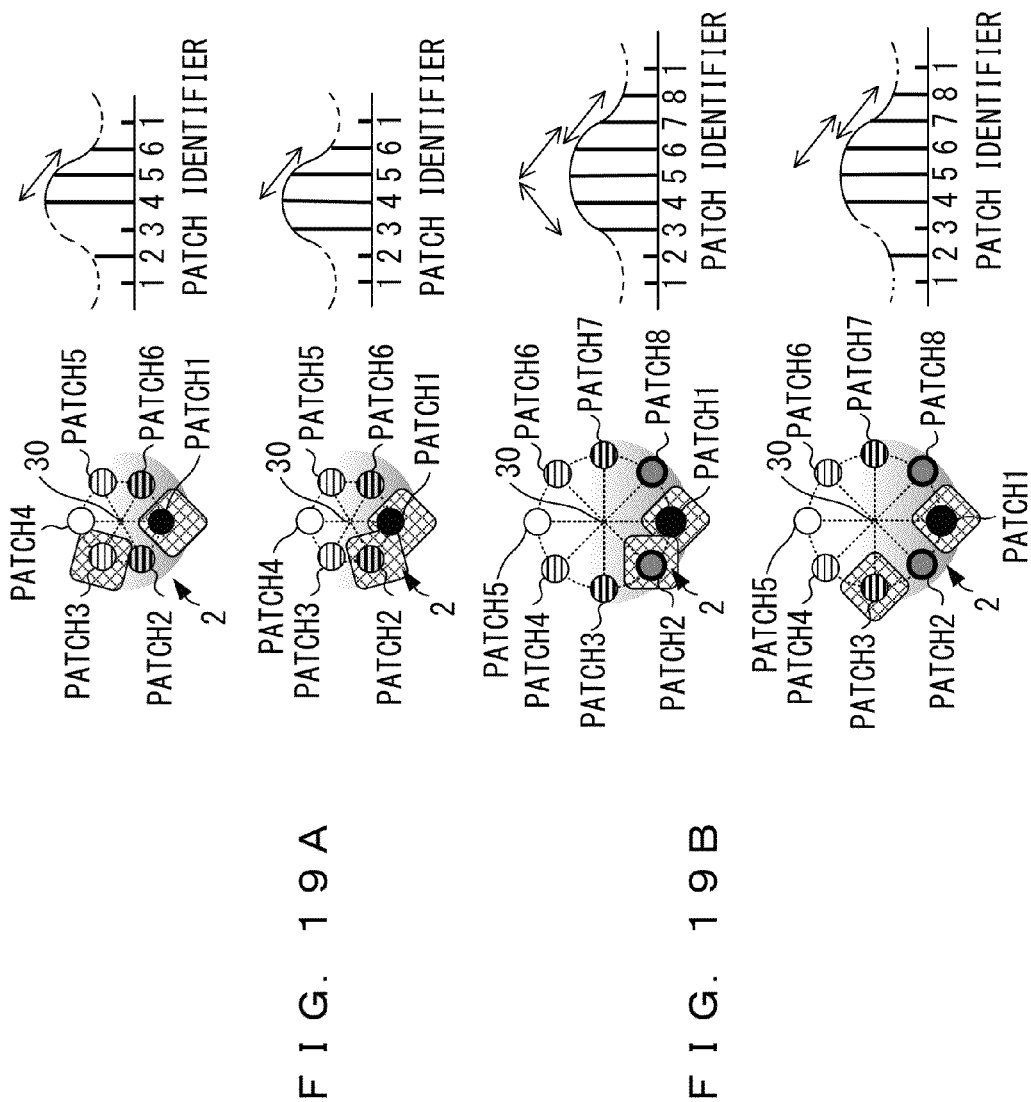

| GROUP | NUMBER OF PATCHES | PATCH IDENTIFIER | | | |
|---|---|---|---|---|---|
| a | 2n | a1 | a2 | ... | a2n |
| b | 2n | b1 | b2 | ... | b2n |
| ... | ... | ... | ... | ... | ... |

2000

F I G. 2 0

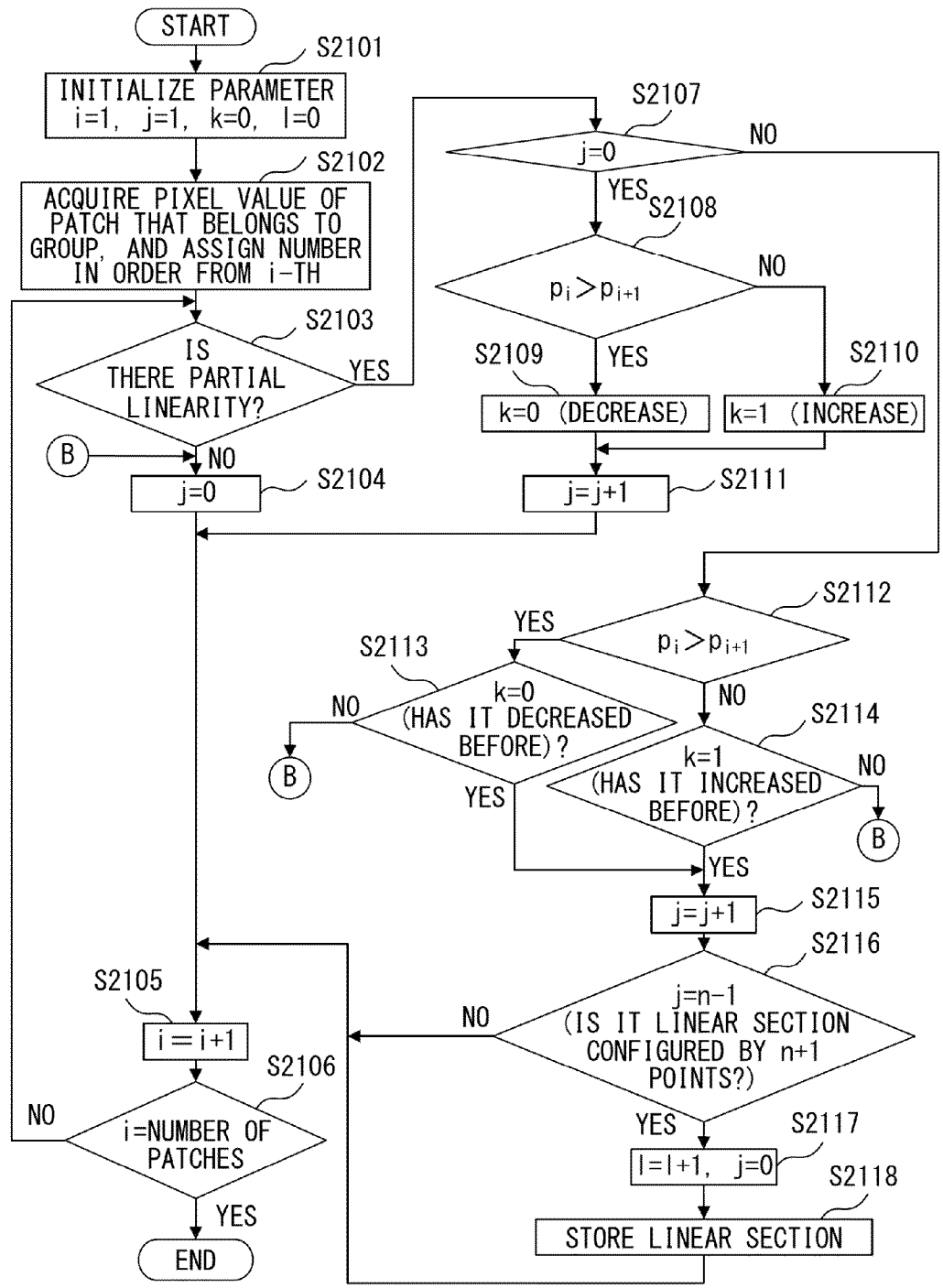
F I G. 2 1

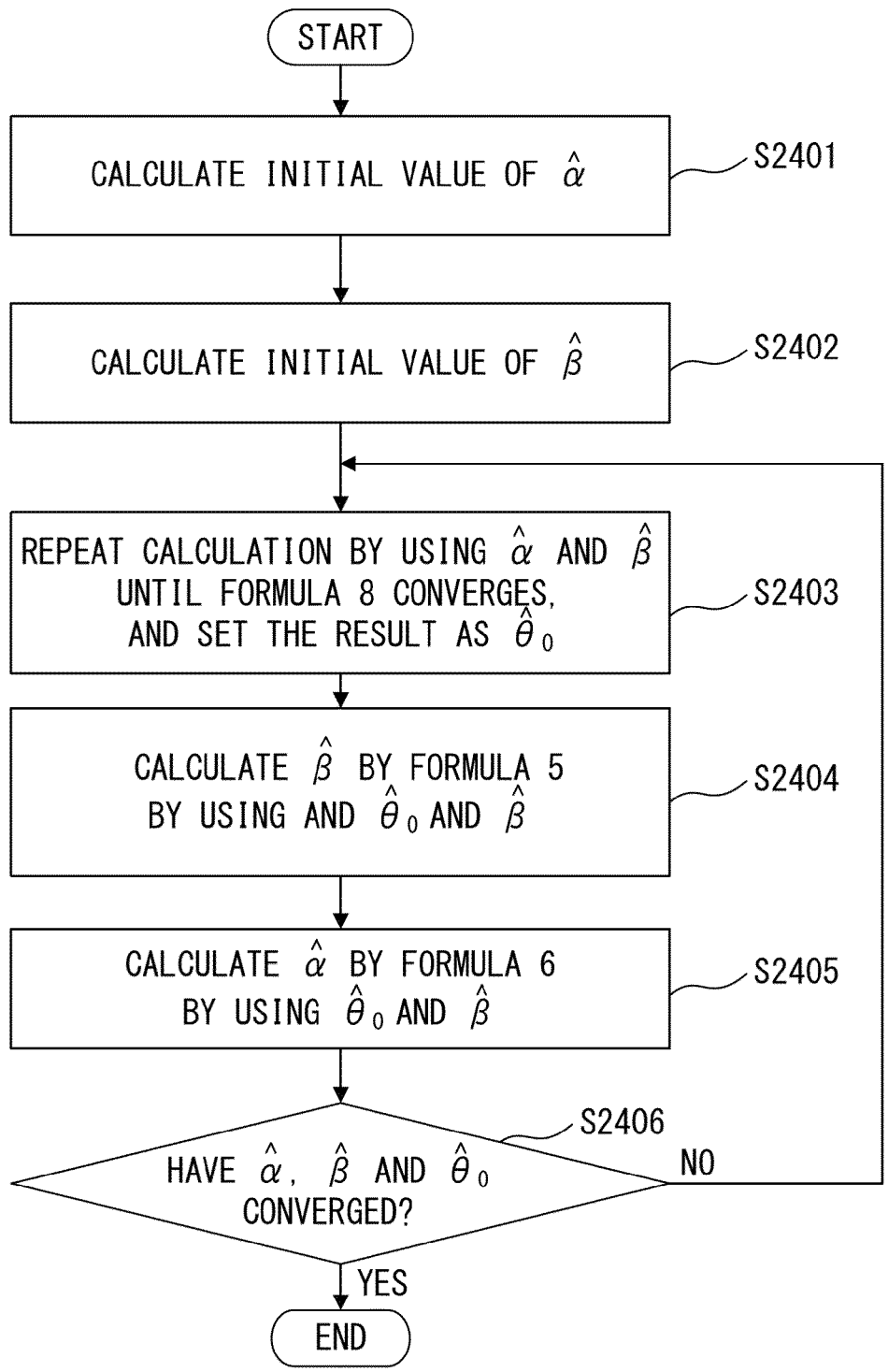
F I G. 24

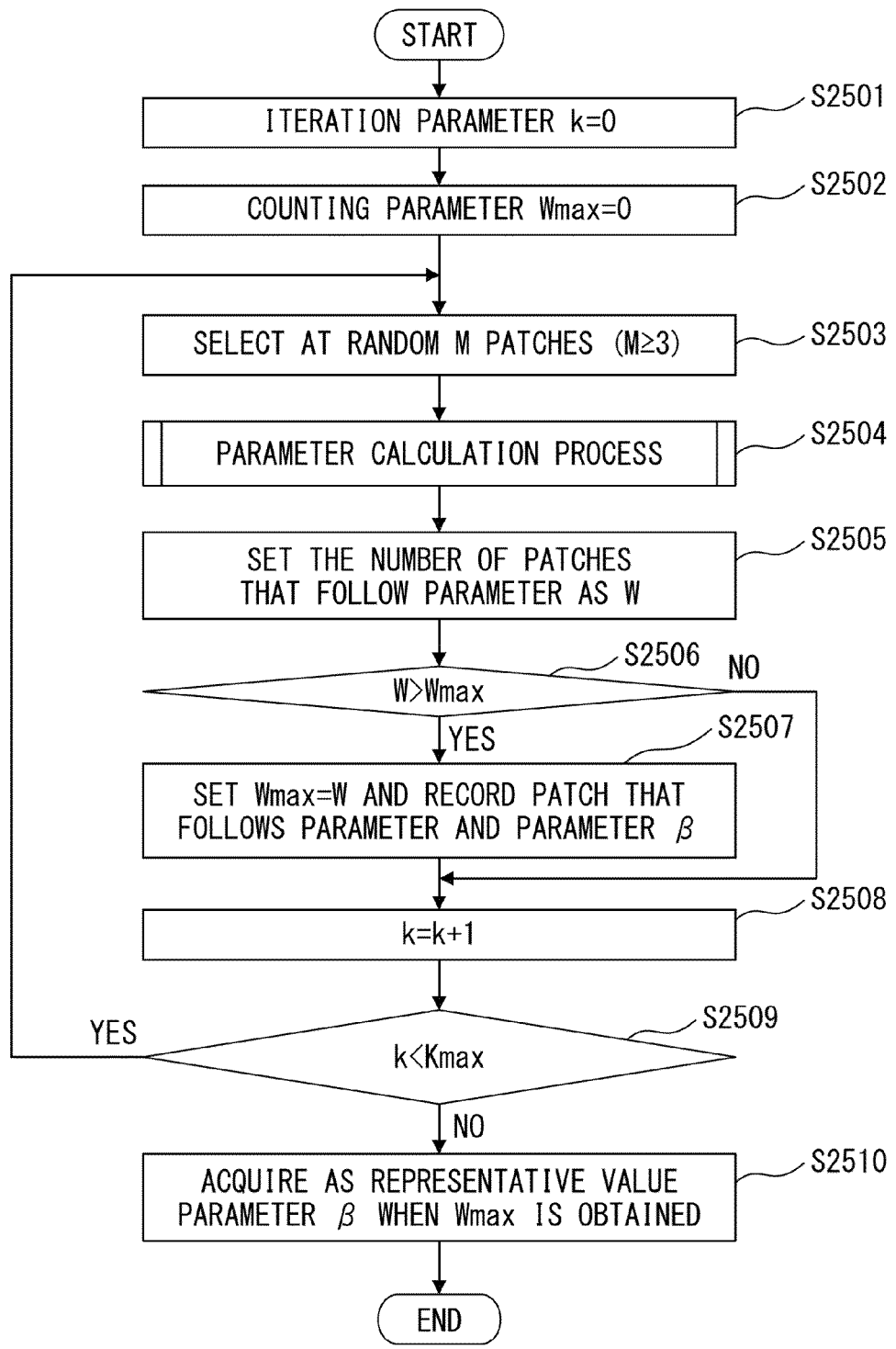
F I G. 2 5

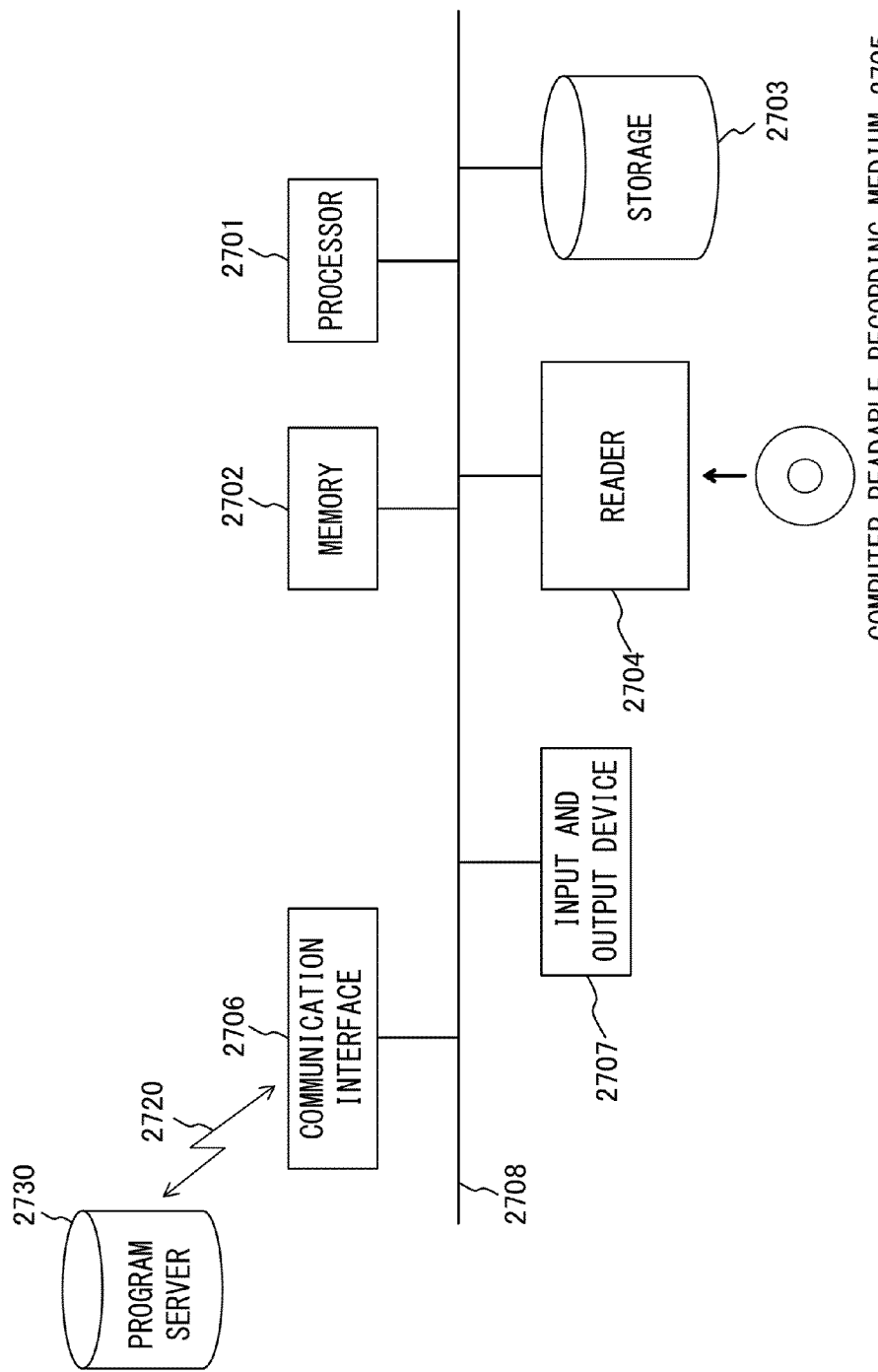
F I G. 2 7

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2014-086258, filed on Apr. 18, 2014, the entire contents of which are incorporated herein by reference.

FIELD

The embodiments discussed herein are related to an image processing device, and an image processing method.

BACKGROUND

An illumination environment when an image is captured changes variously, for example, due to intensity of light from a light source such as sunlight and illumination and effects of a shield that shields light from the light source. When the illumination environment changes, a color of a subject in the image changes into various colors even though the subject is the same.

In this case, there arises a difference between the colors that the subject originally has and the colors of the subject in the captured image according to the illumination environment. Therefore, for example, a color chart in which patches are arranged is captured together with a subject, the patches being obtained by correctly measuring in advance colors by means of a colorimeter etc., and the colors of the subject are corrected with reference to the colors of the patches in the image. That is, for example, a corrected value is calculated so that the color of a patch in the image is made close to the correct color that the patch originally has. By correcting the color of the subject in the image by using the obtained corrected value, it is possible to reproduce the color that the subject originally has.

In the fields of health and beauty, an image of a skin surface is captured, and data on skin conditions, such as the skin color, the number and size of pores, and the size and color density of freckles is obtained from the image, and the skin condition is evaluated according to the data.

In this respect, a technique for improving color measurement accuracy is known. In addition, a technique is known for always calculating correct corrected data even when abnormal data is retrieved in imaging data because external light changes or imaging is interrupted by an obstacle when a test pattern is imaged. A technique is known for suppressing image degradation of a projected image without much labor and time. A technique is known for correcting a color tone deviation between two print pieces without using a color chart. A technique is known for correcting the color tone of an image output apparatus by suppressing unnecessary color-tone conversion. A technique is known for easily extracting an arrangement order of color chip-labeled areas. (For example, see Patent Documents 1-6.)

Patent Document 1: Japanese Laid-open Patent Publication No. 2013-195243
Patent Document 2: Japanese Laid-open Patent Publication No. 2005-150779
Patent Document 3: Japanese Laid-open Patent Publication No. 2001-134252
Patent Document 4: Japanese Laid-open Patent Publication No. 2013-110696
Patent Document 5: Japanese Laid-open Patent Publication No. 2013-26921
Patent Document 6: Japanese Laid-open Patent Publication No. 2013-196373

SUMMARY

According to an aspect of the embodiments, an image processing device includes a processor configured to execute a process including extracting a pixel value of each of a plurality of areas of a same color that are arranged at different positions on a color chart that is captured in an image, and specifying by using the extracted pixel values of the areas and arrangement positions of the areas of the same color an area that has a pixel value that corresponds to a function that expresses fluctuation of pixel values according to a position due to non-uniformity of an illumination environment that fluctuates the pixel values at a constant rate in one direction, and correcting a pixel value of a correction target area between the areas of the same color according to the pixel value of the specified area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are diagrams illustrating a relationship between an illumination environment of an image and a linear section according to the first embodiment.

FIGS. 6A and 6B are diagrams illustrating a relationship between an illumination environment of an image and a linear section according to the first embodiment.

FIGS. 7A and 7B are diagrams illustrating a relationship between an illumination environment of an image and a linear section according to the first embodiment.

FIGS. 8A and 8B are diagrams illustrating a relationship between an illumination environment of an image and a linear section according to the first embodiment.

FIGS. 10A and 10B are diagrams illustrating a relationship between an illumination environment of an image and a linear section according to the first embodiment.

FIG. 11 is a diagram illustrating patch group information according to the first embodiment.

FIG. 12 is a diagram illustrating an operation flow of a pixel value correction process according to the first embodiment.

FIG. 13 is a diagram illustrating an operation flow of a linear section specifying process according to the first embodiment.

FIGS. 16A and 16B are diagrams illustrating a relationship between an illumination environment of an image and a linear section according to the second embodiment.

FIGS. 17A and 17B are diagrams illustrating a relationship between an illumination environment of an image and a linear section according to the second embodiment.

FIGS. 18A and 18B are diagrams illustrating a relationship between an illumination environment of an image and a linear section according to the second embodiment.

FIGS. 19A and 19B are diagrams illustrating a relationship between an illumination environment of an image and a linear section according to the second embodiment.

FIG. 20 is a diagram illustrating patch group information according to the second embodiment.

FIG. 21 is a diagram illustrating an operation flow of a linear section specifying process according to the second embodiment.

FIG. 24 is a diagram illustrating an operation flow of a parameter calculation process according to one embodiment.

FIG. 25 is a diagram illustrating an operation flow of a representative value acquisition process according to a fourth embodiment.

FIG. 27 is a diagram illustrating a hardware configuration of a computer for realizing an image processing device according to one embodiment.

DESCRIPTION OF EMBODIMENTS

Figure 1:
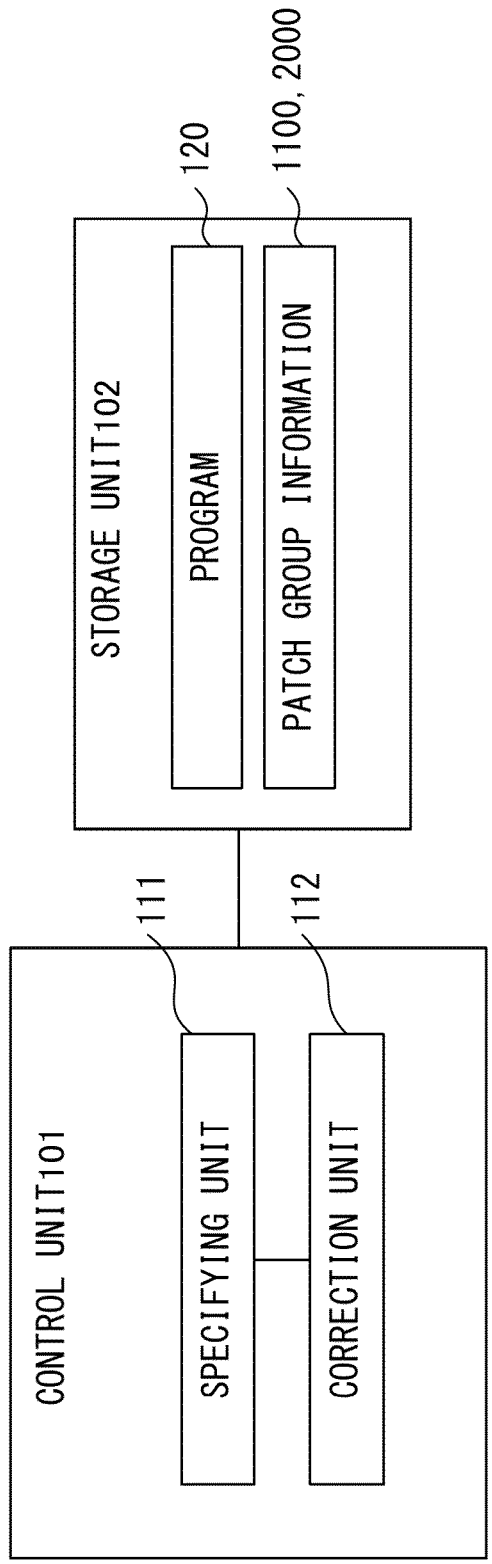
FIG. 1 is a diagram illustrating a functional block configuration of an image processing device according to some embodiments.

Hereinafter, some embodiments will be described in detail with reference to the drawings. The same numerical references are used for corresponding elements in the plurality of drawings.

In a captured image, a color chart may be imaged in a non-uniform illumination environment. For example, in a case in which a user captures an image by bringing a camera close to a surface of a color chart and a subject, when the surface of the color chart or the subject is inclined with respect to a camera lens, the distance from the lens differs from place to place in the captured image due to the inclination. As a result, a difference according to distance may be generated in an amount of light that reaches the camera lens, and a phenomenon of pixel values changing at a constant rate in roughly one direction in the image may occur. When a user captures an image by bringing a camera close to the surface of a color chart or a subject, this phenomenon may be prominent since the color chart or the subject is imaged in a large size in the image. The phenomenon of pixel values changing at a constant rate in roughly one direction in an image is referred to as gradation in the following description. A pixel value is a value that a pixel of an image has, and may be, for example, a brightness value or a color value. The color value may be, for example, a value of each color component in a color space. For example, when an RGB (Red-Green-Blue color model) space, in which primary colors are set to red, green, and blue is used, the pixel value may be each component value of red, green, and blue.

When gradation is generated in an image, there arises a difference between light that strikes a subject, which is a correction target, and light that strikes a patch on a color chart that is used for calculating a corrected value for correction. As a result, even when a process is executed for calculating a corrected value by using pixel values of patches of a color chart in an image and correcting pixel values of a subject in an image by using the obtained corrected value, the pixel values that the subject originally has may not be sufficiently reproduced. A pixel value that the subject originally has may be, for example, a pixel value that corresponds to a value of a correct color etc. that is obtained by measuring the subject with a colorimeter.

In this case, for example, it is assumed that a user uses a color chart that includes a plurality of patches of the same color that are arranged in pairs in a point-symmetrical manner, and an image is captured by sandwiching the subject, which is a correction target, between the pair of patches. Then, for example, it is assumed that a corrected value is calculated by using a value that is obtained by averaging the pixel values of the patches of the same color that are arranged in a point-symmetrical manner in the image, and the pixel value of the subject in the captured image is corrected by using the corrected value. When such correction is performed, since effects are eliminated, the effects being imparted to the pixel values of the patches because of non-uniformity of the illumination environment due to gradation in which the pixel values change at a constant rate in roughly one direction, the pixel value that the subject originally has can be reproduced with high accuracy.

However, as another situation in which a color chart is not imaged in a uniform illumination environment in an image, non-uniformity of an illumination environment that limitedly changes pixel values of some of the plurality of patches that exist on the color chart may be generated in the image. An example thereof is a case in which shade of a finger of a hand that holds the color chart overlaps on some patches or a case in which halation has occurred on some patches due to reflection. In this case, effects of changes in pixel values that limitedly occur on some patches may not be eliminated from a corrected value, and the pixel value that the subject originally has might not be able to be reproduced even though the pixel value is corrected. Accordingly, it is an object in one aspect of the embodiments to reproduce the pixel value that a subject originally has even when non-uniformity of an illumination environment is generated in an image, the non-uniformity limitedly fluctuating pixel values of some of a plurality of patches.

FIG. 1 is a diagram illustrating a functional block configuration of an image processing device 100 according to some embodiments. The image processing device 100 may be an apparatus that includes a function for processing an image, such as a cell phone, a smartphone, a tablet terminal, a personal computer (PC), or a laptop PC. The image processing device 100 includes, for example, a control unit 101 and a storage unit 102. The control unit 101 includes function units such as a specifying unit 111 and a correction unit 112. The storage unit 102 of the image processing device 100 stores, for example, a program 120 and information such as patch group information 1100 and 2000 that will be hereinafter described. The control unit 101 of the image processing device 100 functions as function units such as the specifying unit 111 and the correction unit 112 by reading out and executing the program 120. Details of each function part and details of information that is stored in the storage unit 102 will be hereinafter described.

First Embodiment

Figure 2:
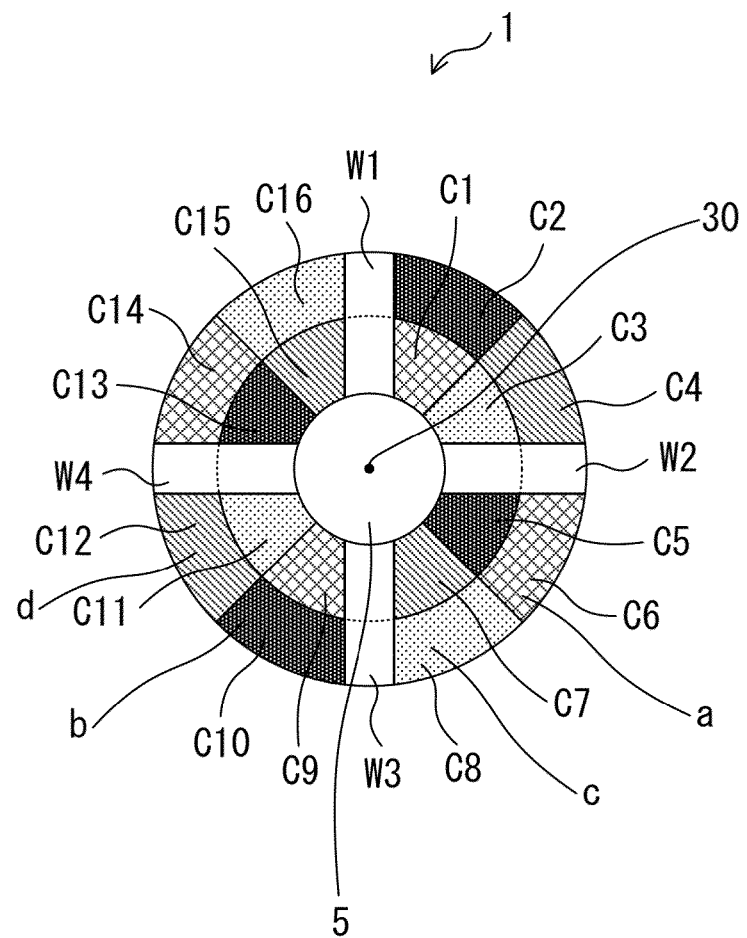
FIG. 2 is a diagram illustrating a color chart according to a first embodiment.

FIG. 2 is a diagram illustrating a color chart 1 according to a first embodiment. The color chart 1 includes a central missing area 5 (for example, a through hole). In the color chart 1, a plurality of patches (W1-W4 and C1-C16) are arranged on the outer circumference of the area 5. As a result, for example, by arranging a subject, which is a pixel value correction target, in the area 5 and capturing an image with an imaging apparatus, the image is captured while surrounding the subject with the patches. The color chart 1 includes two pairs for each color of patches of four colors (a, b, c, and d), that is, four color patches for each color in total. Patch colors may be optional, but it is preferable that the colors are similar to, for example, the pixel value of a subject which is a correction target. For example, when the skin color of a subject is corrected, colors of areas in which human skin color is assumed to be distributed in an RGB space maybe adopted. For example, colors such as pink, yellow, charcoal gray, and magenta may be adopted. For example, each pair of patches are arranged in point-symmetric positions with the center of the area 5 in which the subject, which is a correction target, is imaged as a symmetric point 30.

For example, in the color chart 1, the four patches C1, C6, C9, and C14 have the same color a; patches C2, C5, C10, and C13 have the same color b; patches C3, C8, C11, and C16 have the same color c, and patches C4, C7, C12, and C15 have the same color d. Patch C1 and patch C9 are arranged in a pair at point-symmetric positions with respect to the symmetric point 30. Similarly, patch C6 and patch C14 are arranged in a pair at point-symmetric positions with respect to the symmetric point 30. As illustrated in FIG. 2, with respect to patches C2, C5, C10 and C13, patches C3, C8, C11 and C16, and patches C4, C7, C12, and C15, the patches in pairs are arranged in point-symmetric positions with respect to the symmetric point 30. In the example of FIG. 2, two pairs of patches of the same color, that is, four patches in total, are arranged at equal intervals (for example, at 90-degree intervals from each other) around the symmetric point 30. In addition, the color chart 1 includes four white patches W1-W4, and white balance may be set by using pixel values of the white patches W1-W4 in an image.

Figure 3A:
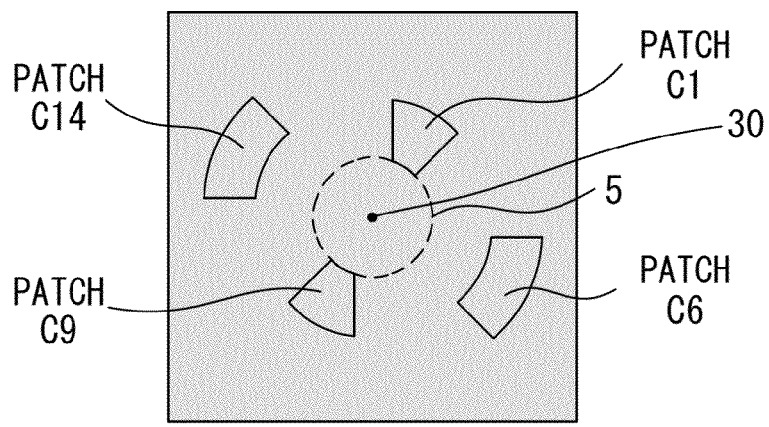
FIGS. 3A-3C are diagrams illustrating a relationship between an illumination environment of an image and a pixel value according to the position of a patch of a same color.
Figure 3B:
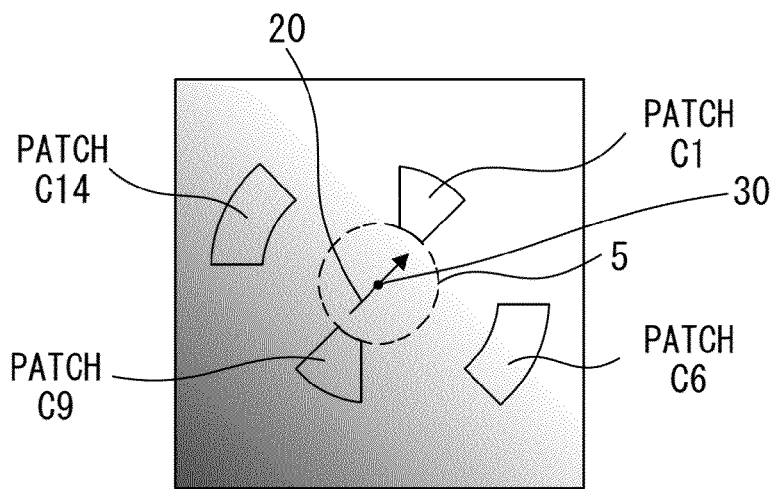
Figure 3C:
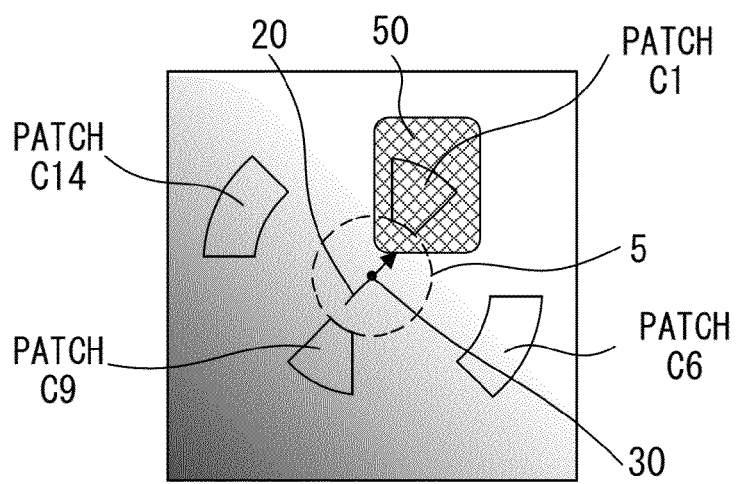

FIGS. 3A-3C are diagrams illustrating a relationship between an illumination environment of an image and pixel values according to positions of four patches of the same color in the color chart 1. Patches C1, C6, C9, and C14 in FIG. 3 correspond to patches C1, C6, C9, and C14 in the color chart 1 in FIG. 2, respectively. FIG. 3A illustrates a relationship between an illumination environment in the case in which the color chart 1 is captured in a uniform illumination environment in an image, and pixel values according to positions of four patches of the same color. As illustrated in FIG. 3A, when an image is captured in a uniform illumination environment over the entire area of the image, the four patches C1, C6, C9, and C14 of the same color, which are arranged in the color chart 1, indicate almost the same pixel values. Therefore, for example, when any of the pixel values of the four patches C1, C6, C9, and C14 of the same color is used for correcting the pixel value of the subject, which is arranged in the area 5 of the color chart 1 in the image, the pixel value that a subject originally has may be reproduced.

FIG. 3B illustrates a relationship between an illumination environment in which gradation in which the pixel values increase at a constant rate in roughly a direction 20 in an image has occurred, and pixel values according to positions of four patches of the same color. In this case, the four patches C1, C6, C9, and C14 of the same color, which are arranged in the color chart 1, show different colors from each other due to gradation. In this state, even when a corrected value is calculated with reference to one pixel value from among the four patches of the same color, which are arranged in the color chart 1, the illumination environment of the patch that has been used as a reference and the illumination environment of a subject, which is a correction target, are different from each other. As a result, even when the pixel value is corrected by using the corrected value that is calculated from the patch that has been used as a reference, the pixel value that the subject originally has may not be reproduced.

In this case, as described above, in gradation, pixel values change at a constant rate in roughly one direction in an image. In the color chart 1, as illustrated in FIG. 2, patches in a pair from among two pairs of patches of the same color, that is, four patches in total, are arranged in point-symmetric positions from the symmetric point 30 (for example, patch C1 and patch C9). Therefore, for example, by averaging the pixel values of patches C1 and C9, which are arranged in point-symmetric positions, effects that non-uniformity of the illumination environment due to gradation has on the pixel values of the patches maybe averaged. Thus, for example, the pixel value of the symmetric point 30 in the area 5 in which the subject is imaged may be estimated. Similarly, since patch C6 and patch C14 in the color chart 1 are point-symmetrically arranged with respect to the symmetric point 30, by averaging the pixel values thereof in the same manner, effects that the non-uniformity of the illumination environment due to gradation has on the pixel values of the patches maybe averaged. As a result, for example, by calculating a corrected value by using as a reference a value that is obtained by averaging the pixel values of patches C1, C6, C9, and C14, and by correcting the pixel value of the subject, the pixel value that the subject originally has may be reproduced.

However, as illustrated in FIG. 3C, for example, non-uniformity of an illumination environment may be generated in an image, the non-uniformity limitedly affecting pixel values of some of the plurality of patches of the same color. Examples of such a case include a case in which shade of a finger etc. overlaps on some patches when the color chart is held in a hand and a case in which reflection of illumination is intense in some patches and halation has occurred in the image. Hereinafter, the non-uniformity of the illumination environment that limitedly affects pixel values of some of the plurality of patches of the same color is referred to as a partial illumination environment change 50. For example, in FIG. 3C, gradation in which the pixel values increase at a constant rate in roughly the direction 20 has been generated, and the partial illumination environment change 50 has occurred in patch C1.

In this case, effects of gradation may not be eliminated due to effects of the partial illumination environment change 50 that has occurred on some of the patches. As a result, the pixel value that the subject originally has may not be reproduced even when the pixel value is corrected.

Therefore, in the first embodiment, the control unit 101 specifies patches that have a pixel value that corresponds to a function that expresses fluctuation of pixel values according to positions due to gradation from among the plurality of patches of the same color that are arranged in the color chart 1 that is captured in the image. Here, when pixel values of patches correspond to the function that expresses fluctuation of the pixel values according to positions due to gradation, it is estimated that the patches have not been affected by a non-uniform illumination environment change other than gradation. Consequently, it is considered that the partial illumination environment change 50 has not occurred in the patches. Therefore, by obtaining a corrected value that is used for correcting a pixel value by using the pixel values of the specified patches, the effects of the partial illumination environment change 50 are eliminated, and the pixel value of the area between patches of the same color (for example, the area 5) may be corrected. As a result, the pixel value that the subject originally has may be reproduced.

FIGS. 4-13 are diagrams explaining pixel value correction according to the first embodiment. Patches C1, C6, C9, and C14 in FIGS. 5-10 correspond to C1, C6, C9, and C14 in the color chart 1 in FIG. 2, respectively. Hereinafter, a sinusoidal function is used as an example of the function that expresses fluctuation of pixel values according to positions due to gradation. The sinusoidal function may be, for example, a sine function or a cosine function. However, the function that is used in the embodiments and expresses fluctuation of pixel values according to positions due to gradation is not limited to this. For example, another function such as a function that expresses fluctuation of pixel values according to positions on an oval shape or a hexagonal shape in an image may be used, as long as the function expresses the fluctuation of pixel values according to positions due to gradation. In this case, a plurality of patches are arranged on a color chart, for example, along the oval shape or the hexagonal shape that is expressed by the function, and it may be judged whether or not the pixel values of the plurality of patches correspond to the function.

Figure 4A:
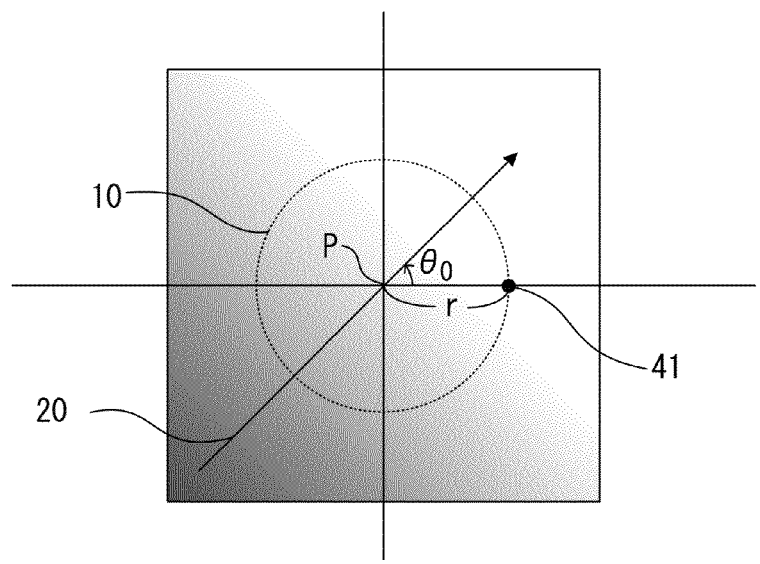
FIGS. 4A and 4B are diagrams illustrating a relationship between gradation and fluctuation of pixel values at points on the circumference of a circle.
Figure 4B:
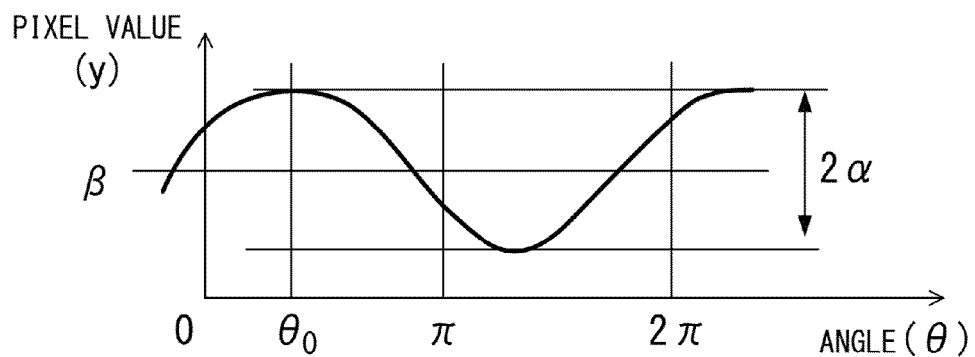

FIGS. 4A and 4B are diagrams illustrating a relationship between fluctuation of pixel values due to gradation that has occurred in an image, and a point on the circumference of a circle with radius r centered at the point P. For example, in FIG. 4A, a change in an illumination environment has been generated in an image due to gradation in which pixel values increase at a constant rate in roughly the direction 20. For example, on the circle with radius r centered at the point P in the image, it is assumed that a point 41 is a point at which the angle θ is 0 degrees. It is assumed that $\theta_0$ is a rotation angle from the point 41 to the direction 20 that indicates an orientation of gradation (that is, $\theta_9$ represents the orientation of gradation). In this case, the pixel value y of a point changes in a sinusoidal curve, the point being obtained by rotating by the angle θ on the circumference of a circle 10 with radius r centered at the point P. Therefore, the pixel value y of a point on the circle 10 may be expressed by using the sinusoidal function, and may be expressed, for example, by the following Formula 1. In the following Formula 1, the counterclockwise rotation direction in FIG. 4A is the positive direction of the angle θ, and α is the value of the amplitude of the sinusoidal curve. Also, β is the value of the vibration center of the wave of the sinusoidal curve, and corresponds to the pixel value at the point P. In Formula 1, a relationship between a point on the circumference of the circle 10 and the pixel value of the point in the case in which gradation has occurred in the image is expressed as a cosine function; however, the embodiments are not limited to this, and for example, a sine function may be used.

$$y = \alpha \cos(\theta - \theta_0) + \beta \qquad \text{[Formula 1]}$$

FIG. 4B is a graph representing a relationship between the pixel value y that is expressed by Formula 1 and the angle θ. As illustrated in FIG. 4B, when pixel values are detected on the circumference of the circle 10 in an image in which gradation that is illustrated in FIG. 4A has been generated, the pixel values change in a sinusoidal curve.

Accordingly, for example, when gradation has been generated in an image that is captured by using the color chart 1 that is illustrated in FIG. 2, the pixel values of four patches of the same color that are included in the color chart 1 correspond to the sinusoidal curve according to positions. FIG. 5A illustrates gradation that has been generated in an image and arrangement of the four patches C1, C6, C9, and C14 of the same color on the color chart 1 that is captured in the image. In this case, as illustrated in FIG. 5B, the pixel values of patches C1, C6, C9, and C14 change roughly in accordance with the sinusoidal function. Here, for example, the sinusoidal curve includes, in a section around the circle 10 in FIG. 4A, a decreasing section in which the pixel values monotonically decrease (for example, the section from $\theta_0$ to $\theta_0+\pi$ in FIG. 4B) and an increasing section in which the pixel values monotonically increase (for example, the section from $\theta_0+\pi$ to $\theta_0+2\pi$ in FIG. 4B). In the color chart 1, the patches in pairs are point-symmetrically arranged. Therefore, three consecutive patches around the area 5 in which the subject is imaged (for example, the section between the pair of patches C1 and C9) corresponds to the section that has the width of the angle n in the sinusoidal curve in FIG. 4B. As a result, as illustrated in FIG. 5B, when the pixel values of patches C1, C6, C9, and C14 of the color chart 1 are lined up in consecutive order around the area 5 in which the subject is imaged, two approximately linear changes in the pixel values are detected with respect to the three consecutive patches.

On the other hand, as illustrated in FIG. 3C, when the partial illumination environment change 50 has occurred in one of the patches of the same color, the pixel value of the patch in which the partial illumination environment change 50 has occurred changes. Therefore, in the decreasing section or the increasing section of the sinusoidal curve that corresponds to the position of the patch in which the partial illumination environment change 50 has occurred, approximately linear increasing or decreasing of the pixel values is not detected.

Therefore, in the first embodiment, the control unit 101 judges whether or not the pixel values of four patches of the same color that are included in the color chart 1 become pixel values that approximately correspond to the sinusoidal function according to linearity that is indicated by a change in the pixel values of the patches in consecutive order around the area 5.

Case 1

As described above, FIG. 5A illustrates gradation that has been generated in an image, and arrangement of the four patches C1, C6, C9, and C14 of the same color on the color chart 1 that is captured in the image. In FIG. 5A, a change in the illumination environment due to gradation has occurred in the image, but the partial illumination environment change 50 has not occurred. In this case, for example, when the pixel values of the four patches of the same color on the color chart (for example, C1, C6, C9, and C14) are lined up in the counterclockwise order C9, C6, C1, and C14, centered at the symmetric point 30, the pixel values of the patches indicate fluctuation that is illustrated in FIG. 5B. In the three clockwise or counterclockwise consecutive patches around the symmetric point 30, two sections in which the pixel values linearly increase or decrease are detected. That is, in FIG. 5B, in the section C9-C6-C1, an approximately linear increase in the pixel value is detected. In the section C1-C14-C9, an approximately linear decrease in the pixel value is detected. In the first embodiment, when the pixel values approximately linearly increase or decrease in three clockwise or counterclockwise consecutive patches centered at the symmetric point 30, the control unit 101 specifies the section of the three consecutive patches as a linear section. That is, in the example of FIG. 5B, the control unit 101 specifies two sections, C9-C6-C1 and C1-C14-C9, as linear sections.

Next, an overlap of linear sections will be described. For example, in FIG. 5B, not both end patches of the two specified linear sections (for example, C1 and C9) but each of the two patches that constitute intermediate points of the linear sections is not used in the different detected linear section. That is, there are no overlapping sections in the two linear sections. In this manner, for example, when a patch that constitutes the intermediate point of the specified linear section is not used in the other linear section, and there are no overlapping sections, it is hereinafter described that the linear sections do not overlap with each other. On the other hand, when the patch that constitutes the intermediate point of the linear section is used in the other linear section, and some sections overlap with each other, it is hereinafter described that the linear sections overlap with each other.

Here, in the color chart 1, since the patches in pairs are point-symmetrically arranged, three consecutive patches around the symmetric point 30 (for example, the section between the pair of patches C1 and C9) correspond to the section with the width of the angle n in the sinusoidal curve in FIG. 4B. Therefore, it is considered that the two specified linear sections that do not overlap with each other correspond, for example, to the decreasing section or the increasing section of the above sinusoidal curve. Therefore, for example, when the two linear sections that do not overlap with each other are specified, it may be considered that the pixel values of the patches that are included in the linear sections correspond to the sinusoidal function. In addition, when the two linear sections that do not overlap with each other are specified, all of the four patches of the same color on the color chart 1 belong to one of the linear sections. Therefore, when the two linear sections are specified, the partial illumination environment change 50 has not occurred in any of the four patches of the same color. As a result, the pixel value that the subject originally has may be reproduced, for example, by acquiring a representative value that represents the pixel value of the four patches C1, C6, C9, and C14 of the same color, and by correcting the pixel values of the image with reference to the obtained representative value. As the representative value, for example, the value that is obtained by averaging the pixel values of the four patches C1, C6, C9, and C14 of the same color may be used.

Case 2

FIGS. 6A and 6B are diagrams illustrating a case in which two linear sections that overlap with each other are detected. In the example of FIG. 6A, a change in the illumination environment that increases the pixel values at a constant rate in an arched direction 40 has occurred in an image. In this case, for example, when the pixel values of four patches of the same color (for example, C1, C6, C9, and C14 of the color chart 1) are lined up in counterclockwise order centered at the symmetric point 30, the pixel values of the patches indicate fluctuation that is illustrated in FIG. 6B. In the three clockwise or counterclockwise consecutive patches centered at the symmetric point 30, two linear fluctuations of the pixel values are detected as illustrated in FIG. 6B. That is, in FIG. 6B, an approximately linear decrease in the pixel value is detected in the order C1-C14-C9, and an approximately linear decrease in the pixel value is detected in the order C14-C9-C6. Therefore, in the example of FIG. 6B, the control unit 101 specifies two linear sections, C1-C14-C9 and C14-C9-C6.

With respect to an overlap of the linear sections, for example, in FIG. 6B, the intermediate point C14 of the first linear section C1-C14-C9 of the two specified linear sections is included in the second linear section C14-C9-C6. Similarly, the intermediate point C9 of the second linear section C14-C9-C6 is included in the first linear section C1-C14-C9. Therefore, the linear sections overlap with each other in C14-C9. Thus, when a change in the illumination environment that fluctuates the pixel values so that the pixel values gradually increase in the direction 40 illustrated in FIG. 6A has been generated in the image, two linear sections that overlap with each other are detected from the pixel values of the four patches of the same color in the color chart 1. In this case, in the change in the pixel value as illustrated in FIG. 6A, the difference in the pixel value between patch C1 and patch C6 is great; however, it is practically rare that such fluctuation in the pixel value is caused by a change in the illumination environment. Therefore, in the first embodiment, when two linear sections are detected and the two detected linear sections overlap with each other, the control unit 101 may judge that the pixel values of the four patches of the same color in the color chart 1 do not correspond to the sinusoidal function. In this case, the control unit 101 may prompt a user to capture an image again, for example, by outputting error information without correcting the pixel value.

Case 3-1

Next, case 3-1 will be illustrated in which the partial illumination environment change 50 has occurred in some of the four patches of the same color in an image. An example of the case in which the partial illumination environment change 50 has occurred in the image is a case in which shade of a finger etc. when the color chart is held in a hand overlaps on some patches or a case in which halation has occurred in some patches due to light reflection.

FIGS. 7A and 7B are diagrams illustrating a case in which the partial illumination environment change 50 has occurred in a position in which the pixel value becomes highest in the change in the pixel value due to gradation. In FIG. 7A, gradation has been generated so that the pixel values gradually increase in the direction 20 in an image. In FIG. 7A, in patch C1, which exists in a position in which the pixel value is highest in the change in the pixel value due to gradation, the partial illumination environment change 50 has occurred. In FIG. 7A, the partial illumination environment change 50 does not overlap patches C6, C9, and C14 of the same color as that of patch C1, and has not affected the pixel values thereof. In this case, for example, when the pixel values of four patches of the same color (for example, C1, C6, C9, and C14 of the color chart 1) are lined up in counterclockwise order centered at the symmetric point 30, the pixel values in FIG. 7B are detected. Here, the pixel value of patch C1 is lowered because the partial illumination environment change 50 has occurred in patch C1. Therefore, in the three clockwise or counterclockwise consecutive patches around the symmetric point 30, linear fluctuation of the pixel values is not detected, and no linear sections are specified. Accordingly, for example, when the partial illumination environment change 50 has occurred in a patch in which the pixel value is highest in the change in the pixel value due to gradation, no linear sections are specified. When no linear sections are specified, the control unit 101 may judge, for example, that the pixel value of at least one of the four patches of the same color in the color chart 1 does not correspond to the sinusoidal function. In this case, at least one of the patches is affected by a non-uniform illumination environment change other than gradation. As a result, the control unit 101 may detect that the partial illumination environment change 50 has occurred in at least one of the four patches of the same color.

Case 3-2

Next, case 3-2 will be illustrated in which the partial illumination environment change 50 has occurred in some of the four patches of the same color in an image. An example of the case in which the partial illumination environment change 50 has occurred in the image is a case in which shade of a finger etc. when the color chart is held in a hand overlaps some patches or a case in which halation has occurred in some patches due to light reflection.

FIGS. 8A and 8B are diagrams illustrating a case in which the partial illumination environment change 50 has occurred in a position in which the pixel value becomes lowest in the change in the pixel value due to gradation. In FIG. 8A, gradation has been generated so that the pixel values gradually increase in the direction 20 in an image. In FIG. 8A, in patch C9, which exists in a position in which the pixel value is lowest in the change in the pixel value due to gradation, the partial illumination environment change 50 has occurred. In FIG. 8A, the partial illumination environment change 50 does not overlap patches C1, C6, and C14 of the same color as that of patch C9, and has not affected the pixel values thereof. In this case, for example, when the pixel values of the four patches of the same color (for example, C1, C6, C9, and C14 of the color chart 1) are lined up in counterclockwise order centered at the symmetric point 30, the pixel values in FIG. 8B are detected. Here, the pixel value of patch C9 is lowered because the partial illumination environment change 50 has occurred in patch C9. Therefore, in the three clockwise or counterclockwise consecutive patches around the symmetric point 30, linear fluctuation of the pixel values is not detected, and no linear sections are specified. Accordingly, for example, when the partial illumination environment change 50 has occurred in a patch in which the pixel value is lowest in the change in the pixel value due to gradation, no linear sections are specified.

Case 3-3

Next, case 3-3 will be illustrated in which the partial illumination environment change 50 has occurred in some of the four patches of the same color in an image. An example of the case in which the partial illumination environment change 50 has occurred in the image is a case in which shade of a finger etc. when the color chart is held in a hand overlaps some patches or a case in which halation has occurred in some patches due to light reflection.

Figure 9A:
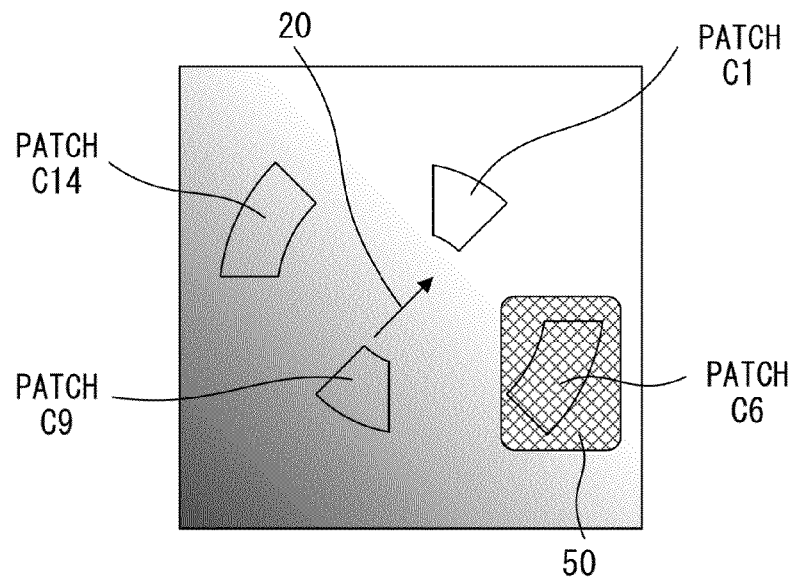
FIGS. 9A and 9B are diagrams illustrating a relationship between an illumination environment of an image and a linear section according to the first embodiment.
Figure 9B:
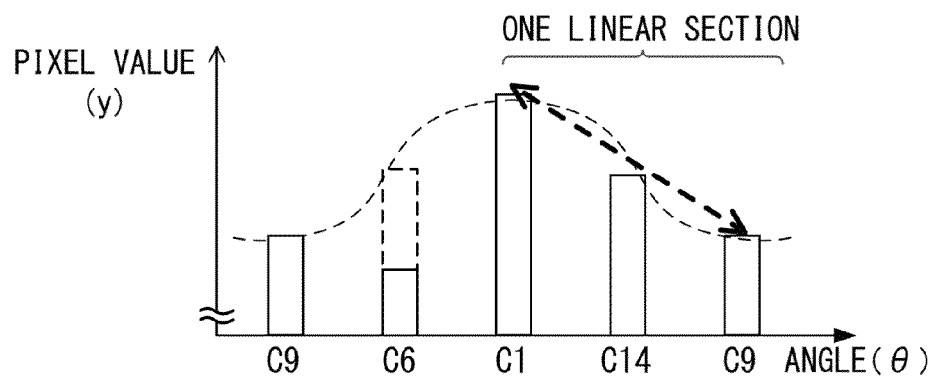

FIGS. 9A and 9B are diagrams illustrating a case in which the partial illumination environment change 50 has occurred in a position of a patch in which the pixel value thereof has an intermediate value in the change in the pixel value due to gradation. In FIG. 9A, gradation has generated so that the pixel values gradually increase in the direction 20 in an image. In FIG. 9A, in patch C6, which exists in a position in which the pixel value has the intermediate value in the change in the pixel value due to gradation, the partial illumination environment change 50 has occurred. In FIG. 9A, the partial illumination environment change 50 does not overlap patches C1, C9, and C14 of the same color as that of patch C6, and has not affected the pixel values thereof. In this case, for example, when the pixel values of four patches of the same color (for example, C1, C6, C9, and C14 of the color chart 1) are lined up in counterclockwise order centered at the symmetric point 30, the pixel values in FIG. 9B are detected. Then, for example, one linear section in which the pixel values linearly change in the three counterclockwise consecutive patches C1-C14-C9 is specified. On the other hand, the pixel value of patch C6 is lowered because the partial illumination environment change 50 has occurred in patch C6, and for example, the linear section C9-C6-C1, which has been specified in FIG. 5B, is not specified. Accordingly, for example, when the partial illumination environment change 50 has occurred in a patch which has the intermediate value in the change in the pixel value due to gradation, one linear section is specified. In this case, the control unit 101 may judge, for example, that the three patches that are included in the specified one linear section have pixel values that correspond to the sinusoidal function. In this case, the three patches that are included in the one linear section are not affected by a non-uniform illumination environment change other than gradation. As a result, the control unit 101 may judge that the partial illumination environment change 50 has not occurred in the three patches that are included in the one linear section. The control unit 101, for example, may judge that patch C6, which is not included in the one specified linear section, is not a patch that has a pixel value that corresponds to the sinusoidal function, and may judge that the partial illumination environment change 50 has occurred in patch C6.

Case 4

FIGS. 10A and 10B illustrate a case in which in addition to a change in the pixel value due to gradation, the partial illumination environment change 50 has occurred in a plurality of patches from among patches of the same color. In FIG. 10A, gradation has been generated so that the pixel values gradually increase in the direction 20 in an image. In FIG. 10A, the partial illumination environment change 50 has occurred in a plurality of patches (for example, C6 and C14) from among patches of the same color. In this case, for example, when the pixel values of the four patches of the same color (for example, C1, C6, C9, and C14 of the color chart 1) are lined up in counterclockwise order centered at the symmetric point 30, the pixel values of FIG. 10B are detected. Since the partial illumination environment change 50 has occurred in C6 and C14, no linear changes in the pixel value are detected in the three clockwise or counterclockwise consecutive patches centered at the symmetric point 30. Accordingly, for example, when the partial illumination environment change 50 has occurred in a plurality of patches from among four patches of the same color, no linear sections are specified.

As described in the above cases 1-4, it is assumed that the pixel values of two pairs of patches of the same color, that is, four patches in total, are lined up in clockwise or counterclockwise order centered at the symmetric point 30. In this case, the control unit 101 may detect that the partial illumination environment change 50 has occurred in an image, from the number of linear sections that are specified from the sequence of the pixel values.

For example, when two linear sections are specified from the pixel values of four patches of the same color, the control unit 101 may judge that the partial illumination environment change 50 has not occurred in the image, as described in case 1 or case 2.

In addition, the control unit 101 may distinguish the change in the pixel value due to linear gradation illustrated in case 1 from the special change in the pixel value illustrated in case 2, by judging whether or not the two detected linear sections overlap with each other. Then, when the linear sections do not overlap with each other and a change in the pixel value due to gradation as illustrated in case 1 has occurred, the control unit 101 may correct the pixel values with reference to, for example, a value that is obtained by averaging the pixel values of the four patches of the same color that are included in the two linear sections. When the linear sections overlap with each other and the special change in the pixel value illustrated in case 2 has occurred, the control unit 101 may prompt a user to capture an image again by outputting error information.

On the other hand, when two linear sections are not specified from pixel values of two pairs of patches of the same color, that is, four patches in total, the control unit 101 may judge that the partial illumination environment change 50 has occurred in some of the four patches of the same color. In this case, for example, even when the pixel values are corrected with reference to the value that is obtained by averaging the pixel values of the four patches of the same color, since the pixel values of some of the patches have been changed due to the partial illumination environment change 50, the pixel value that the subject originally has may not be reproduced. Therefore, when two linear sections are not specified from the pixel values of the four patches of the same color, the control unit 101 may prompt a user to capture an image again by outputting error information. As a result, for example, the user may capture images until an image for which the pixel value correction is likely to be successful can be captured. As a result, the pixel value that the subject originally has may be reproduced.

Alternatively, when one linear section is specified from the pixel values of two pairs of patches of the same color, that is, four patches in total, the control unit 101 may acquire a representative value that represents the pixel values of the patches that are included in the one specified linear section, and may correct the pixel value. For example, the representative value may be obtained as follows.

For example, when one linear section is specified, the patch that has the intermediate pixel value from among the pixel values of the three consecutive patches that are included in the one specified linear section has a value close to the pixel value of the vibration center β in the sinusoidal function illustrated in FIG. 4B. Therefore, the control unit 101 may acquire as the representative value the pixel value of the intermediate patch from among the three consecutive patches that are included in the one detected linear section, and may correct the pixel value with reference to the obtained representative value. Alternatively, since both end patches of the patches that constitute the one detected linear section (for example, patches C1 and C9 in FIGS. 9A and 9B) form a pair, the control unit 101 may obtain as the representative value the value that is obtained by averaging the pixel values of the patches, and may correct the pixel value of the subject with reference to the obtained representative value. In another example, the control unit 101 calculates the average value between the pixel value of the patch that has the maximum pixel value (for example, C1 in FIGS. 9A and 9B) and the pixel value of the patch that has the minimum pixel value (for example, C9 in FIGS. 9A and 9B) from among the patches that constitute the one detected linear section. Then, the control unit 101 may further calculate the average value between the obtained average value and the pixel value of the patch that has the intermediate pixel value (for example, C14 in FIGS. 9A and 9B), and may use the average value as the representative value. As described above, when one linear section is detected, the control unit 101 may obtain the representative value according to the pixel values of the patches that are included in the one linear section by excluding the pixel value of the patch that is not included in the one detected linear section, and may correct the pixel value. In addition, the representative value may be obtained by another technique according to the pixel values of the patches that are included in the one linear section so that the value that is close to, for example, the pixel value of the vibration center β in the sinusoidal function illustrated in FIG. 4B may be obtained.

Next, judgment of a linear section will be exemplified. A linear section according to the first embodiment may be specified, for example, by means of the following judgment. For example, it is assumed that one patch from among four patches of the same color that are included in the color chart 1 is referred to as an i-th patch, and the pixel values of the three clockwise or counterclockwise consecutive patches centered at the symmetric point 30 from the i-th patch are referred to as $p_i$, $p_{i+1}$, and $p_{i+2}$. In this case, when the relationship $p_i \leq p_{i+1} \leq p_{i+2}$ or the relationship $p_i \geq p_{i+1} \geq p_{i+2}$ is established for the pixel values of the three consecutive patches, and when the following Formula A1 is satisfied, the control unit 101 may specify the three consecutive patches as a linear section.

$$p_{i-1} - th < (p_i + p_{i+2})/2 < p_{i+1} + th \quad \text{[Formula A1]}$$

Here, th is a threshold value that is set so as to judge whether or not the fluctuation of the pixel values is linear. As the threshold th, for example, a value may be set that is 10% or 20% of the difference $|p_- - p_{i+2}|$ in a case in which the relationship $p_i \leq p_{i+1} \leq p_{i+2}$ or the relationship $p_i \geq p_{i+1} \geq p_{i+2}$ is established for the pixel values of the three consecutive patches around the symmetric point 30. A threshold value that is determined by an evaluation environment etc. may be stored in advance in the storage unit 102 and may be used as the value of the threshold th, for example, in a case in which the intensity of gradation that is generated when an image is captured by using the color chart 1 maybe estimated to some extent.

Next, a pixel value correction process according to the first embodiment will be described with reference to FIG. 11 and FIG. 12. FIG. 11 is a diagram illustrating the patch group information 1100 according to the first embodiment. The patch group information 1100 includes items such as a group, the number of patches, and a patch identifier. The group indicates a group that corresponds to four colors (a, b, c, and d) of the patches that are arranged in the color chart 1. The number of patches indicates the number of patches of the same color that are included in each group. In the patch identifier, identifiers that are assigned to the four patches of the same color that are included in each group are registered. In the example of FIG. 11, in the patch identifier, four patches of each group are registered in clockwise order centered at the symmetric point 30. For example, in the case of group a, patches are lined up and registered in the order C1, C6, C9, C14.

FIG. 12 is an operation flow diagram illustrating the pixel value correction process according to the first embodiment. The operation flow of the pixel value correction process in FIG. 12 is implemented, for example, by means of reading and execution by the control unit 101 of the program 120 that is stored in the storage unit 102. In one embodiment, when an execution instruction for the pixel value correction process is input to the control unit 101, the operation flow of FIG. 12 is initiated.

In step 1201 (hereinafter, step is referred to as "S", so that, for example, step 1201 is referred to as S1201), the control unit 101 executes a linear section specifying process.

FIG. 13 is a diagram illustrating the operation flow of the linear section specifying process according to the first embodiment. The operation flow of the linear section specifying process in FIG. 13 is implemented, for example, by means of reading and execution by the control unit 101 of the program 120 that is stored in the storage unit 102. In one embodiment, when the flow proceeds to S1201 in FIG. 12, the linear section specifying process in FIG. 13 is initiated.

In S1301, the control unit 101 sets the value of parameter i=1, and the value of parameter l=0, initializing parameter i and parameter l. In S1302, the control unit 101 acquires from an image the pixel values of the patches that belong to the same group in the patch group information 1100. For example, in the case of group a of the patch group information 1100, the control unit 101 acquires the pixel values of patches C1, C6, C9, and C14. The pixel values may be acquired from the patches on the color chart 1 that is captured in the image by using various techniques. For example, when a mark that indicates a position is attached to the surface of the color chart 1 on which the patches are arranged, the control unit 101 may acquire the pixel values of the patches by specifying the area of each patch that is included in the color chart with reference to the position of the mark in the image. Alternatively, in another embodiment, the pixel values may be acquired from the patches on the color chart that is captured in the image by using the technique that is disclosed in Patent Document 6. Then, the control unit 101 assigns a number that starts with i-th to each of the obtained pixel values p of the patches, for example, in clockwise order centered at the symmetric point 30. For example, when the pixel values of C1, C6, C9, and C14 of group a are acquired, the control unit 101 assigns $p_1$, $p_1$, $p_3$, and $p_4$ to the pixel values of patches C1, C6, C9, and C14, respectively. Here, the pixel value of C1 may be $p_1$, the pixel value of C6 may be $p_2$, the pixel value of C9 may be $p_3$, and the pixel value of C14 may be $p_4$.

In S1303, the control unit 101 judges whether or not the pixel values $p_i$, $p+_1$, and $p_{i+2}$ of the three clockwise consecutive patches of the same color centered at the symmetric point 30 are a linear section. For example, as described above, when the relationship $p_i \leq p_{i+1} \leq p_{i+2}$ or the relationship $p_i \geq p_{i+1} \geq p_{i+2}$ is established for the pixel values $p_i$, $p_i+_1$, and $p_{i+2}$, and the above Formula A1 is satisfied, the control unit 101 may specify the three consecutive patches of the same color as a linear section. In S1303, for example, when the value i+1 and the value i+2 exceed the number of patches of the patch group information 1100, the value i+1 and the value i+2 are returned to 1. For example, when i=4, the value i+1=5 and the value i+2=6 exceed 4, which is the number of patches of group a of the patch group information 1100. In this case, the value i+1 is returned to 1 and the value i+2 becomes 2. Accordingly, for example, when i=4 in S1303, the control unit 101 may judge whether or not the pixel values $p_4$, $p_1$, and $p_2$ of the patches that have the patch identifiers C14, C1, and C6, respectively, are a linear section.

When the pixel values are not a linear section (No in S1303), the flow proceeds to S1306. On the other hand, when the pixel values are a linear section (Yes in S1303), the flow proceeds to S1304. In S1304, the control unit 101 stores the specified linear section in the storage unit 102. For example, in S1302, it is assumed that the pixel values of C1, C6, C9, and C14 are acquired as $p_1$, $p_2$, $p_3$, and $p_4$, respectively, and a linear section is specified in the sequence of the pixel values $p_1$, $p_2$, and $p_3$. In this case, the consecutive three patches C1-C6-C9 that are specified to be a linear section may be stored in the storage unit 102.

In S1305, the control unit 101 increases the value of parameter l by one. Parameter l is a parameter for counting the number of linear sections in the operation flow in FIG. 13. In S1306, the control unit 101 increase the value of parameter i by one. In S1307, the control unit 101 judges whether or not the value of parameter i exceeds the number of patches of the patch group information 1100. When the value of parameter i does not exceed the number of patches of the patch group information 1100 (No in S1307), the flow returns to S1303, and the control unit 101 repeats the process. That is, for example, in the processes in S1303-S1307, i increases by one every time the process is repeated, and the control unit 101 judges whether or not the combinations $p_1$-$p_2$-$p_3$, $p_2$-$p_3$-$p_4$, $p_3$-$p_4$-$p_1$, and $p_4$-$p_1$-$p_2$ are linear sections. The control 101 stores in the storage unit 102 the patches that are judged to be a linear section in these combinations, and counts the number of linear sections by means of parameter l. In S1307, when the value of parameter i exceeds the number of patches of the patch group information 1100 (Yes in S1307), this operation flow terminates, and the flow proceeds to S1202 in FIG. 12.

In S1202, the control unit 101 judges whether or not the number of linear sections is 2 (that is, parameter l=2). When the number of linear sections is 2 (Yes in S1202), the flow proceeds to S1203. In S1203, the control unit 101 judges whether or not the two linear sections overlap with each other. For example, when the intermediate patch from among the three consecutive patches that have been stored as a linear section in the storage unit 102 in S1304 is included in the three consecutive patches of the other linear section, the control unit 101 may judge that the linear sections overlap with each other. When the two linear sections do not overlap with each other (No in S1203), the flow proceeds to S1204. The case in which the two linear sections do not overlap with each other is, for example, case 1 that is exemplified with reference to FIG. 5, and in this case, the control unit 101 may judge that the partial illumination environment change 50 has not occurred in the four patches of the same color, for which the two linear sections that do not overlap with each other are specified. In S1204, the control unit 101 acquires a representative value that represents the pixel values of the four patches of the same color, for which the two linear sections that do not overlap with each other have been specified. The representative value may be, for example, an average value such as the arithmetic average or the weighted average of the pixel values of the four patches of the same color. In S1205, the control unit 101 corrects the pixel values of the subject with reference to the acquired representative value. The pixel values maybe corrected, for example, by using the technique disclosed in Patent Document 1.

On the other hand, when the two linear sections overlap with each other in S1203 (Yes in S1203), the flow proceeds to S1206. The case in which the two linear sections overlap with each other is, for example, a case in which the special change in the pixel value of case 2 exemplified with reference to FIG. 6 has occurred. When the special change in the pixel value that has been described in case 2 has occurred, the pixel value that the subject originally has may not be reproduced even when the pixel value of the image is corrected.

Therefore, in S1206, the control unit 101 outputs error information, and this operation flow is terminated. Output of error information maybe performed by displaying a message etc. that prompts a user to capture an image again on the display screen of the image processing device 100.

In S1202, when the number of linear sections is not 2 (No in S1202), the flow proceeds to S1207. In S1207, the control unit 101 judges whether or not the number of linear sections is one (that is, parameter l=1). When the number of linear sections is one (Yes in S1207), the flow proceeds to S1208. In S1208, the control unit 101 acquires a representative value that represents the pixel values of the three patches of the same color that are included in the one linear section.

For example, the control unit 101 may set as the representative value the pixel value of the intermediate patch of the three consecutive patches that are included in the one detected linear section. Alternatively, since both end patches from among the patches that are included in the one specified linear section (for example, patches C1 and C9 in FIGS. 9A and 9B) form a pair, the control unit 101 may use as the representative value an average value such as the arithmetic average or the weighted average of the pixel values of both end patches. Next, in S1205, the control unit 101 corrects the pixel values of the subject with reference to the acquired representative value, and this operation flow is terminated. As described above, when one linear section is detected, the control unit 101 may acquire the representative value by excluding the pixel value of the patch that is not included in the one linear section that has been specified in the linear section specifying process in S1201, and may correct the pixel value. Thus, since the patch in which the partial illumination environment change 50 has occurred is excluded when the pixel value is corrected, the pixel value that the subject originally has may be reproduced.

On the other hand, when the number of linear sections is not one in S1207 (No in S1207), the flow proceeds to S1206. In S1206, the control unit 101 outputs error information and this operation flow is terminated. Examples of the case in which the judgment is No in S1207 include case 3-1, case 3-2, and case 4 exemplified with reference to FIGS. 7, 8, and 10, respectively, in which the partial illumination environment change 50 has occurred. In such a case, for example, even when the pixel value is corrected according to the pixel values of the four patches of the same color that include the patch in which the partial illumination environment change 50 has occurred, the pixel value that the subject originally has may not be reproduced. Therefore, the control unit 101 may output error information in S1206. Output of error information is, for example, performed by displaying a message etc. that prompts a user to capture an image again on the display screen of the image processing device 100.

As described above, according to the first embodiment, the control unit 101 may specify a patch that has a pixel value that corresponds to a sinusoidal function from among four patches of the same color according to a linear section that is specified from the pixel values of the four patches of the same color on the color chart 1. For example, when two linear sections that do not overlap with each other are specified, all four patches of the same color may be specified as patches that have pixel values that correspond to the sinusoidal function. In this case, the control unit 101 may judge that the partial illumination environment change 50 has occurred in none of the four patches of the same color. Thus, the control unit 101 may reproduce the pixel value that the subject originally has by acquiring a representative value from the pixel values of the four patches of the same color, and by correcting the pixel value with reference to the acquired representative value.

On the other hand, the control unit 101 may detect that the partial illumination environment change 50 has occurred in one of the four patches of the same color according to the linear section that has been specified from the pixel values of the four patches of the same color. For example, when one linear section is specified, the control unit 101 may specify three patches of the same color that are included in the one linear section as patches that have pixel values that correspond to the sinusoidal function. In addition, the control unit 101 may detect that the partial illumination environment change 50 has occurred in the remaining one patch of the same color that is not included in the one linear section from among the four patches of the same color. Therefore, the control unit 101 may exclude the patch in which the partial illumination environment change 50 has occurred when the pixel value is corrected. Even when the partial illumination environment change 50 has occurred, the control unit 101 may acquire the representative value from the pixel values of the three patches of the same color that are included in the one linear section, and may correct the pixel value with reference to the acquired representative value. Therefore, the pixel value that the subject originally has may be reproduced.

For example, when no linear sections are specified, the control unit 101 may detect that the partial illumination environment change 50 has occurred in one of the patches. As a result, the control unit 101 may prompt a user to capture an image again by outputting error information, and therefore, the user may capture images until an image for which pixel value correction is likely to be successful may be captured. As a result, the user may capture an image in which the pixel value that the subject originally has may be reproduced. As described above, in the fields of health and beauty, an image of a skin surface is captured, and data on skin conditions, such as the skin color, the number and size of pores, and the size and color density of freckles, is obtained from the image, and the skin condition is evaluated according to the data. For example, in such a case, evaluating the skin condition by using an image in which pixel values that the subject originally has are not reproduced will lead to an erroneous evaluation. Therefore, for example, it is preferable that a user may capture images until an image for which pixel value correction is likely to be successful may be captured, and an image in which the pixel value that the subject originally has may be reproduced may be acquired, since this leads to an improvement in the accuracy of evaluating the skin condition.

In the above example, a description has been given by taking as an example a case in which the color chart 1 includes two pairs of patches of the same color, that is, four patches in total. However, the embodiments are not limited to this, and for example, the color chart may include two or more pairs of patches of the same color. In this case, for example, the control unit 101 may judge whether or not the pixel values of the patches of the same color that continue in the section from one of the pair of the patches of the same color to the other patch of the same color from among the two or more patches of the same color indicate a linear fluctuation. When the control unit 101 judges that a linear fluctuation is indicated in the section from one of the pair of the patches of the same color to the other patch of the same color, the control unit 101 may specify the section as a linear section. Assume, for example, that the color chart includes three pairs of the patches of the same color, that is, six patches in total. In this case, for example, in S1303, when the pixel values approximately linearly increase or decrease in four consecutive patches around the area 5 in which the subject is imaged, the control unit 101 may specify the section of the four consecutive patches as a linear section.

In the above operation flow in FIG. 12, in the processes in S1201-S1203, S1206, and S1207, the control unit 101 of the image processing device 100 functions, for example, as the specifying unit 111. In the processes in S1204, S1205, and S1208, the control unit 101 of the image processing device 100 functions, for example, as the correction unit 112.

In the operation flow in FIG. 13, in the processes in S1301-S1307, the control unit 101 of the image processing device 100 functions, for example, as the specifying unit 111.

Second Embodiment

Next, with reference to FIGS. 14-21, a second embodiment will be described. In the second embodiment, a pixel value correction process, for example, when a color chart 2 is used will be exemplified, and the color chart 2 includes three or more pairs of patches of the same color that are point-symmetrically arranged with respect to the symmetric point 30 around an area that is a correction target, by assuming the symmetric point 30 to be the center of the area that is the correction target.

In FIGS. 14-19, arrangement of patches of one color of the color chart 2 that includes three or more pairs of patches of the same color according to the second embodiment is illustrated as an example. For example, in FIG. 14A, FIG. 15, and FIGS. 16A-19A, an arrangement of patches of the same color in the case in which the color chart 2 includes three pairs of patches of the same color is illustrated. In the color chart 2, six patches 1-6 of the same color are arranged in point-symmetric positions, for example, by setting as the symmetric point 30 the center of the area in which a subject, which is a correction target, is imaged. Here, for example, patches 1 and 4, patches 2 and 5, and patches 3 and 6 are paired patches that are arranged in point-symmetric positions centered at the symmetric point 30, respectively. In the examples in FIG. 14A, FIG. 15, and FIGS. 16A-19A, patches 1-6 are arranged at approximately equal intervals around the symmetric point 30. In the examples in FIG. 14A, and FIGS. 16A-19A, gradation has been generated so that the pixel values become gradually higher from patch 1 to patch 4.

FIG. 14B, and FIGS. 16B-19B illustrate an arrangement of patches of the same color in the case in which the color chart 2 includes four pairs of patches of the same color. In FIG. 14B, and FIGS. 16B-19B, eight patches 1-8 of the same color are arranged in point-symmetric positions, for example, by setting as the symmetric point 30 the center of an area in which a subject, which is a correction target, is imaged. Here, for example, patches 1 and 5, patches 2 and 6, patches 3 and 7, and patches 4 and 8 are paired patches that are arranged in point-symmetric positions centered at the symmetric point 30, respectively. In the examples in FIG. 14B, and FIGS. 16B-19B, patches 1-8 are arranged at approximately equal intervals around the symmetric point 30. In the examples in FIG. 14B, and FIGS. 16B-19B, a change in the illumination environment due to gradation has been generated in the image so that the pixel values become gradually higher from patch 1 to patch 5. For example, in the second embodiment, which uses the above color chart 2 that has three or more pairs of the patches of the same color, a linear section may be specified as follows.

Case 5

Figure 14A:
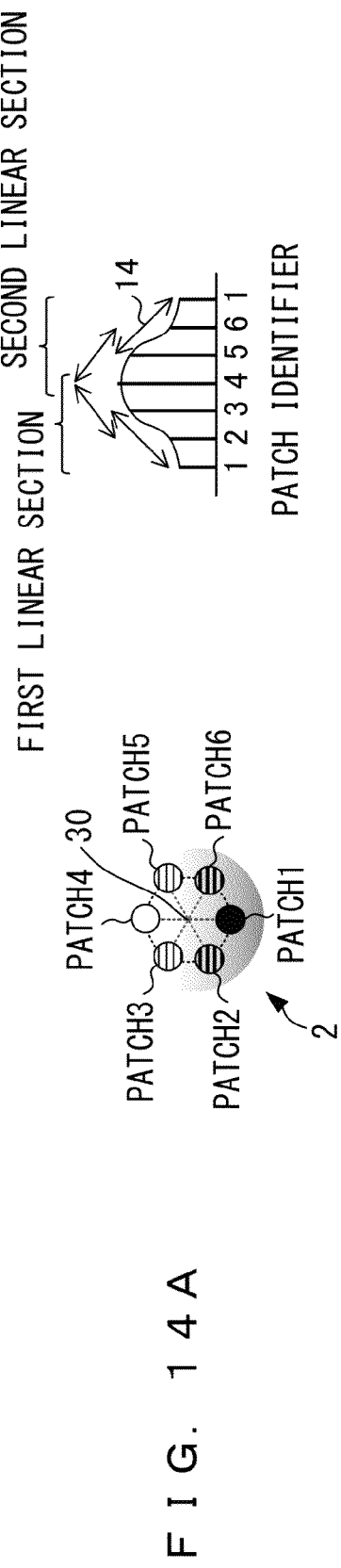
FIGS. 14A and 14B are diagrams illustrating a relationship between an illumination environment of an image and a linear section according to a second embodiment.
Figure 14B:
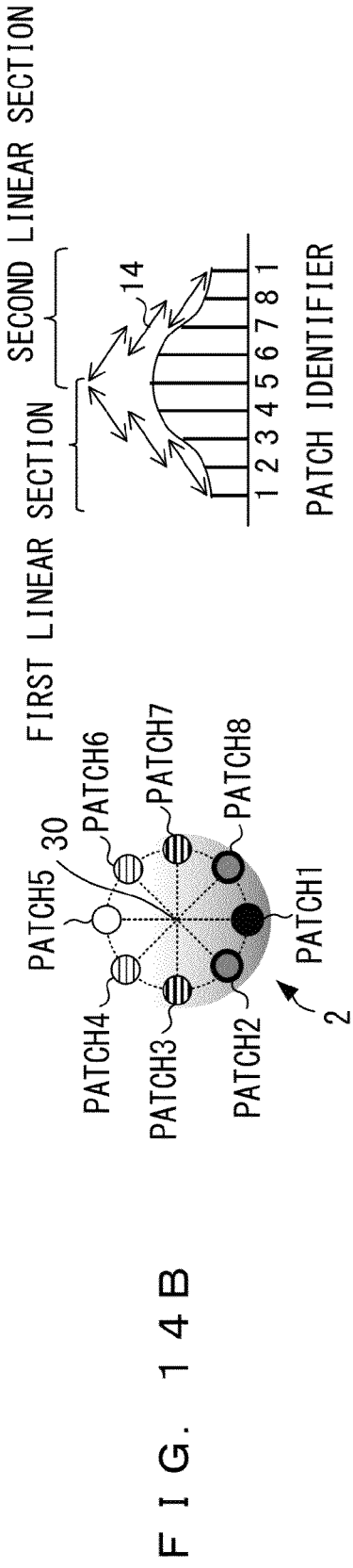

As illustrated in FIGS. 14A and 14B, case 5 exemplifies specifying of a linear section in a case in which the partial illumination environment change 50 that limitedly affects the pixel values of some of the plurality of patches of the same color has not been generated, and a change in the illumination environment due to gradation has occurred. For example, when n pairs of patches of the same color, that is, 2n patches in total (where n is an integer equal to or greater than 3) are included in the color chart 2, a patch from among the patches of the same color is referred to as an i–th patch. The pixel values of the three clockwise consecutive patches from the i–th patch around the area in which the subject, which is a correction target is imaged are referred to as $p_i$, $p_{i+1}$, and $p_{i+2}$. In this case, the control unit 101 judges whether or not the relationship $p_i \leq p_{i+1} \leq p_{i+2}$ or the relationship $p_i \geq p_{i+1} \geq p_{i+2}$ is established for the pixel values of the three consecutive patches, and the above Formula A1 is satisfied. When the relationship $p_i \leq p_{i+1} \leq p_{i+2}$ or the relationship $p_i \geq p_{i+1} \geq p_{i+2}$ is established for the pixel values of the three consecutive patches, and the following Formula A1 is satisfied, the control unit 101 judges that the three consecutive patches have partial linearity. The judgment is made by considering each of the 2n patches of the same color on the color chart 2 as an i–th patch, and the control unit 101 acquires partial linearity that is included in the 2n patches of the same color.

For example, in FIG. 14A, the color chart 2 includes 2n=6 (n=3 pairs of) patches 1-6 of the same color. In this case, as illustrated by arrows 14 in FIG. 14A, four sets of partial linearity of patches 1-2-3, 2-3-4, 4-5-6, and 5-6-1 are detected.

The control unit 101 compares, for example, the pixel value $p_i$ and the pixel value $p_{i+1}$ in the detected partial linearity, and specifies whether or not the fluctuation direction of the partial linearity is an increasing direction or a decreasing direction from $p_i$ to $p_{i+1}$. When pieces of partial linearity that have the same fluctuation direction continue in a section that is constituted by (n+1) consecutive patches of the same color around the symmetric point 30, the control unit 101 specifies the section that is constituted by the (n+1) consecutive patches of the same color as a linear section. Therefore, in the second embodiment, a linear section contains a plurality of pieces of partial linearity that have the same fluctuation direction; however, the pixel values do not need to linearly fluctuate throughout the linear section. In FIG. 14A, since n=3, n+1=4. The partial linearity is constituted by three consecutive points around the symmetric point 30. Therefore, when two sets of partial linearity that have the same fluctuation direction continue, the control unit 101 may specify as a linear section the section in which the two sets of partial linearity continue. When the partial linearity is constituted by three consecutive points around the symmetric point 30, when (n−1) sets of partial linearity that have the same fluctuation direction continue, the control unit 101 may specify as a linear section the section in which the (n-1) sets of partial linearity continue.

For example, in FIG. 14A, from among the detected partial linearity, patches 1-2-3 and patches 2-3-4 continue clockwise in the color chart 2. The fluctuation direction of the partial linearity of patches 1-2-3 and that of patches 2-3-4 are both increasing directions and agree with each other. Therefore, the control unit 101 may specify as a linear section the section in which the two sets of partial linearity continue, that is, patches 1-2-3-4. The linear section includes n+1 (that is, 4) patches.

Similarly, from among the detected partial linearity, patches 4-5-6 and patches 5-6-1 continue clockwise in the color chart 2. The fluctuation direction of the partial linearity of patches 4-5-6 and that of patches 5-6-1 are both decreasing directions and agree with each other. Therefore, the control unit 101 may specify as a linear section the section in which the two sets of partial linearity continue, that is, patches 4-5-6-1. Therefore, in FIG. 14A, the control unit 101 may specify two linear sections.

FIG. 14B illustrates a case in which the color chart 2 includes 2n=8 (n=4 pairs of) patches of the same color. In this case, n+1=5. Partial linearity includes three consecutive patches of the same color around the symmetric point 30. Therefore, when three sets of partial linearity that have the same fluctuation direction continue, the control unit 101 may specify the section as a linear section.

For example, in FIG. 14B, three consecutive sets of partial linearity continue in patches 1-2-3, patches 2-3-4, and patches 3-4-5. The pixel values increase from $p_i$ to $p_{i+1}$ in all the sets of partial linearity, and the fluctuation directions of the pixel values agree with one another. Therefore, the control unit 101 may specify as a linear section the section in which the three sets of partial linearity continue, that is, patches 1-2-3-4-5. Similarly, in FIG. 14B, three consecutive sets of partial linearity in which the fluctuation directions of the pixel values are decreasing directions and agree with one another in patches 5-6-7, patches 6-7-8, and patches 7-8-1. Therefore, the control unit 101 may specify as a linear section the section in which the three sets of partial linearity continue, that is, patches 5-6-7-8-1. Therefore, in FIG. 14B, the control unit 101 may specify two linear sections.

Next, an overlap of linear sections will be described. For example, not both end patches of the two linear sections that are specified in FIG. 14A but each of the four patches that are intermediate points of the linear sections (patches 2, 3, 5, and 6) are not used in the other detected section. In this manner, for example, when a patch that constitutes the intermediate point of the specified linear section is not used in the other linear section, the control unit 101 may judge that the linear sections do not overlap with each other. On the other hand, when the patch that constitutes the intermediate point of the linear section is used in the other linear section, the control unit 101 may judge that the linear sections overlap with each other.

In the second embodiment, a linear section includes n+1 consecutive patches of the same color around the symmetric point 30, and corresponds to a section between a pair of patches in the color chart 2 (for example, the section from patch 1 to patch 4 in FIG. 14A). Therefore, for example, the linear section has the width of the angle n in the sinusoidal curve in FIG. 4B, and corresponds to the decreasing section or the increasing section of the above sinusoidal curve. Therefore, when linear sections that do not overlap with each other are specified, it may be considered that the pixel values of the patches that are included in the linear sections are pixel values that correspond to the sinusoidal function. In addition, when two linear sections are specified, all of the 2n patches of the same color belong to either one of the linear sections. Therefore, when two linear sections are specified, the partial illumination environment change 50 has not occurred in any of the 2n patches of the same color. As a result, for example, the control unit 101 may reproduce the pixel value that the subject originally has by acquiring a representative value that represents the pixel values of the 2n patches of the same color, and by correcting the pixel value of the image with reference to the acquired representative value. As the representative value, for example, a value that is obtained by averaging the pixel values of the 2n patches of the same color may be used.

Case 6

Figure 15:
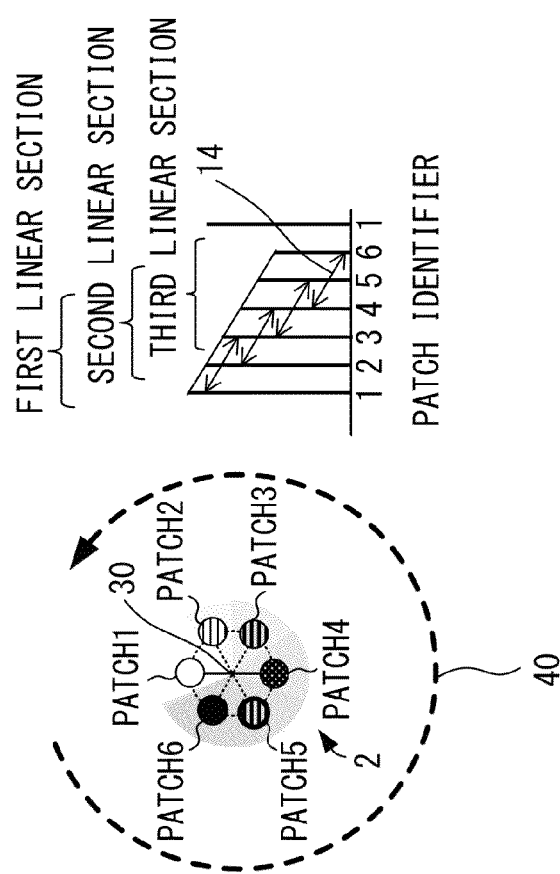
FIG. 15 is a diagram illustrating a relationship between an illumination environment of an image and a linear section according to the second embodiment.

Case 6 illustrates a case in which two or more linear sections that overlap with each other are specified. FIG. 15 is a diagram illustrating a case in which two or more linear sections that overlap with each other are specified, and a change in the illumination environment that fluctuates the pixel values so that the pixel values gradually increase in a direction 40 has occurred in an image. In this case, as illustrated by arrows 14 in FIG. 15, four sets of partial linearity of patches 1-2-3, patches 2-3-4, patches 3-4-5, and patches 4-5-6 are detected. In all the pieces of partial linearity, the pixel values decrease from $p_i$ to $p_{i+1}$, and the fluctuation directions of the pixel values agree with one another. Since n=3, the control unit 101 may specify a linear section in a section in which two sets of partial linearity in which the fluctuation directions of the pixel values agree with each other continue. Therefore, in FIG. 15, the control unit 101 specifies three linear sections in patches 1-2-3-4, patches 2-3-4-5, and patches 3-4-5-6.

On the other hand, each of the patches (patches 2, 3, 4, and 5) which are intermediate points of the three linear sections is used in another detected section. Therefore, the control unit 101 may judge that the linear sections overlap with each other. Thus, when two or more linear sections that overlap with each other are detected from the pixel values of 2n patches of the same color in this manner, there is a portion in which the difference in the pixel value is great such as in the portion between patch 1 and patch 6 in FIG. 15, and it is practically rare that such a change in the pixel value occurs. Therefore, in the second embodiment, when two or more linear sections that overlap with each other are detected, the control unit 101 may prompt a user to capture an image again, for example, by outputting error information without correcting the pixel value.

Case 7-1

Next, specifying of a linear section in case 7-1 will be exemplified in which the partial illumination environment change 50 has occurred in some of the plurality of patches of the same color in an image.

FIGS. 16A and 16B are a diagram illustrating a case in which the partial illumination environment change 50 has occurred in a position in which the pixel value becomes highest in the change in the pixel value due to gradation. In FIG. 16A, the color chart 2 includes 2n=6 (n=3 pairs of) patches of the same color. Since n=3, the control unit 101 may specify a linear section in the section in which two sets of partial linearity in which the fluctuation directions of the pixel values agree with each other continue. However, since the partial illumination environment change 50 has occurred in patch 4, the pixel value thereof is lowered, and the partial linearity of patches 2-3-4 and patches 4-5-6, which has been detected in FIG. 14A, is not detected in FIG. 16A. Therefore, in FIG. 16A, two consecutive sets of partial linearity in which the fluctuation directions of the pixel values agree with each other are not detected, and no linear sections are specified.

In FIG. 16B, the color chart 2 includes 2n=8 (n=4 pairs of) patches of the same color. Since n=4, the control unit 101 may specify a linear section in the section in which three sets of partial linearity in which the fluctuation directions of the pixel values agree with one another continue. However, since the partial illumination environment change 50 has occurred in patch 5, the pixel value thereof is lowered, and the partial linearity of patches 3-4-5 and patches 5-6-7, which has been detected in FIG. 14B, is not detected in FIG. 16B. Therefore, in FIG. 16B, three consecutive sets of partial linearity in which the fluctuation directions of the pixel values agree with one another are not detected, and no linear sections are specified.

Case 7-2

Next, specifying of a linear section in case 7-2 will be exemplified in which the partial illumination environment change 50 has occurred in some of the plurality of patches of the same color in an image.

FIGS. 17A and 17B are diagrams illustrating a case in which the partial illumination environment change 50 has occurred in a position in which the pixel value becomes lowest in the change in the pixel value due to gradation. In FIG. 17A, the color chart 2 includes 2n=6 (n=3 pairs of) patches of the same color. Since n=3, the control unit 101 may specify a linear section in the section in which two sets of partial linearity in which the fluctuation directions of the pixel values agree with each other continue. However, since the partial illumination environment change 50 has occurred in patch 1, the pixel value is lowered, and the partial linearity of patches 1-2-3 and patches 5-6-1 that has been detected in FIG. 14A is not detected in FIG. 17A. Therefore, in FIG. 17A, two consecutive sets of partial linearity in which the fluctuation directions of the pixel values agree with each other are not detected, and no linear sections are specified.

In FIG. 17B, the color chart 2 includes 2n=8 (n=4 pairs of) patches of the same color. Since n=4, the control unit 101 may specify a linear section in the section in which three sets of partial linearity in which the fluctuation directions of the pixel values agree with one another continue. However, since the partial illumination environment change 50 has occurred in patch 1, the pixel value thereof is lowered, and the partial linearity of patches 1-2-3 and patches 7-8-1, which has been detected in FIG. 14B, is not detected in FIG. 17B. Therefore, in FIG. 17B, three consecutive sets of partial linearity in which the fluctuation directions of the pixel values agree with one another are not detected, and no linear sections are specified.

Case 7-3

Next, specifying of a linear section in case 7-3 will be exemplified in which the partial illumination environment change 50 has occurred in some of the plurality of patches of the same color in an image. FIGS. 18A and 18B are diagrams illustrating a case in which the partial illumination environment change 50 has occurred in a patch that has the intermediate pixel value in the change in the pixel value due to gradation. In FIG. 18A, the color chart 2 includes 2n=6 (n=3 pairs of) patches of the same color. Since n=3, the control unit 101 may specify a linear section in the section in which two sets of partial linearity in which the fluctuation directions of the pixel values agree with each other continue. In FIG. 18A, two sets of partial linearity in which the fluctuation directions of the pixel values agree with each other continue in patches 4-5-6 and patches 5-6-1. Therefore, the control unit 101 may specify a linear section in the section of the two sets of partial linearity, patches 4-5-6-1. On the other hand, since the partial illumination environment change 50 has occurred in patch 3 and the pixel value thereof is lowered, the partial linearity of patches 1-2-3 and patches 2-3-4, which has been detected in FIG. 14A, is not detected in FIG. 18A. Therefore, in FIG. 18A, the control unit 101 may specify one linear section.

In FIG. 18B, the color chart 2 includes 2n=8 (n=4 pairs of) patches of the same color. Since n=4, the control unit 101 may specify a linear section in the section in which three sets of partial linearity in which the fluctuation directions of the pixel values agree with one another continue. In FIG. 18B, in patches 5-6-7, patches 6-7-8, and patches 7-8-1, three sets of partial linearity in which the fluctuation directions of the pixel values agree with one another continue. Therefore, the control unit 101 may specify a linear section in the section of the three sets of partial linearity, patches 5-6-7-8-1. On the other hand, since the partial illumination environment change 50 has occurred in patch 3 and the pixel value thereof is lowered, the partial linearity of patches 1-2-3, patches 2-3-4, and patches 3-4-5, which has been detected in FIG. 14B, is not detected in FIG. 18B. Therefore, in FIG. 18B, the control unit 101 may specify one linear section.

Case 8

FIGS. 19A and 19B are diagrams illustrating a case in which, in addition to the change in the pixel value due to gradation, the partial illumination environment change 50 has occurred in two or more patches of the same color. In FIG. 19A, the color chart 2 includes 2n=6 (n=3 pairs of) patches of the same color. Since n=3, the control unit 101 may specify a linear section in the section in which two sets of partial linearity in which the fluctuation directions of the pixel values agree with each other continue. However, in the two examples illustrated in FIG. 19A, since two consecutive sets of partial linearity in which the fluctuation directions of the pixel values agree with each other are not detected, the control unit 101 may judge that there are no linear sections. As another example, when the partial illumination environment change 50 has occurred in patch 2 and patch 3, one linear section may be specified in the section, patches 4-5-6-1.

In FIG. 19B, the color chart 2 includes 2n=8 (n=4 pairs of) patches of the same color. Since n=4, the control unit 101 may specify a linear section in the section in which three sets of partial linearity in which the fluctuation directions of the pixel values agree with one another continue. However, in the two examples illustrated in FIG. 19B, since three consecutive sets of partial linearity in which the fluctuation directions of the pixel values agree with one another are not detected, the control unit 101 may judge that there are no linear sections. As another example, when the partial illumination environment change 50 has occurred in patch 2 and patch 4, one linear section may be specified in the section, patches 5-6-7-8-1.

As described in the above cases 5-8, even when the color chart 2 includes n pairs of patches of the same color, that is, 2n patches in total, the control unit 101 may specify a linear section. The control unit 101 may detect, for example, that the partial illumination environment change 50 has occurred in an image, from the number of specified linear sections. The control unit 101 may detect that the special change in the pixel value that has been described in case 6 has occurred from the detected overlap of the linear sections.

FIG. 20 is a diagram illustrating the patch group information 2000 according to the second embodiment. The patch group information 2000 includes items such as a group, the number of patches, and a patch identifier. The group indicates a group that corresponds to each color that is arranged in the color chart 2. For example, when patches of five colors are arranged in the color chart 2, five groups may be registered in the patch group information 2000. The number of patches indicates the number of patches of the same color that are included in each group, and the color chart 2 includes 2n patches of the same color. In the patch identifier, identifiers that are assigned to the 2n patches of the same color that are included in each group are registered. In the patch identifier, identifiers of the 2n patches of the same color that belong to the same group of the color chart 2 may be registered, for example, in clockwise order around the area in which the subject, which is the correction target, is imaged. For example, in the case of group a, patches are lined up and registered in the order a1, a2, . . . a2n, which may indicate that the patches are lined up in the clockwise order a1, a2, . . . a2n around the area in which the subject, which is the correction target, is imaged in the color chart 2.

Next, a pixel value correction process according to the second embodiment will be described. In the second embodiment, for example, when an execution instruction for the pixel value correction process is input to the control unit 101, the control unit 101 may initiate the operation flow of the pixel value correction process illustrated in FIG. 12.

In step 1201, the control unit 101 executes a linear section specifying process. In the second embodiment, the control unit 101 may execute the operation flow of the linear section specifying process in FIG. 21.

FIG. 21 is a diagram illustrating the operation flow of the linear section specifying process according to the second embodiment. The operation flow of the linear section specifying process in FIG. 21 is implemented, for example, by means of reading and execution by the control unit 101 of the program 120 that is stored in the storage unit 102. In one embodiment, when the flow proceeds to S1201 in FIG. 12, the linear section specifying process in FIG. 21 is initiated.

In S2101, the control unit 101 sets the values of parameters i, j, k, and l to 1, 1, 0, and 0, respectively, initializing parameters i, j, k, and l. In S2102, the control unit 101 acquires from an image the pixel values of the patches that belong to the same group in the patch group information 2000. For example, in the case of group a of the patch group information 2000, the control unit 101 acquires the pixel values of patches a1, a2, . . . a2n. The pixel values may be acquired from the patches on the color chart 2 that is captured in the image by using various techniques. For example, when a mark that indicates a position is attached to a surface on which the patches of the color chart 2 are arranged, the control unit 101 may acquire the pixel values of the patches by specifying the area of each patch that is included in the color chart 2 with reference to the position of the mark in the image. Alternatively, in another embodiment, the pixel values may be acquired from the patches on the color chart 2 that is captured in an image by using the technique that is disclosed in Patent Document 6. Then, the control unit 101 assigns a number in an order from i-th to each of the obtained pixel values p of the patches that have been acquired in clockwise order centered at the symmetric point 30 of the color chart 2. For example, when the pixel values of a1, a2, . . . a2n are acquired, the control unit 101 assigns $p_1, p_2, \ldots p_{2n}$ to the pixel values of patches a1, a2, . . . a2n, respectively. Here, for example, the pixel value of patch a1 may be $p_1$, the pixel value of a2 may be $p_2$, and the pixel value of a2n may be $p_{2n}$.

In S2103, the control unit 101 judges whether or not the pixel values $p_1, p_i+_1$, and $p_{i+2}$ of, for example, three clockwise consecutive patches of the same color centered at the symmetric point 30 have partial linearity by setting as the symmetric point 30 the center of the area in which the subject, which is the correction target, is imaged. For example, when the relationship $p_i \leq p_{i+1} \leq p_{i+2}$ or the relationship $p_i \geq p_{i+1} \geq p_{i+2}$ is established for the pixel values $p_i$, $p_i+_1$, and $p_{i+2}$, and the above Formula A1 is satisfied, the control unit 101 may judge that the pixel values have partial linearity. For example, when the values i+1 and i+2 exceed the number of patches of the patch group information 2000, it is assumed that the values are returned to 1. That is, for example, when i=2n, i+1=2n+1 and i+2=2n+1 exceed 2n, which is the number of patches of group a of the patch group information 2000. In this case, i+1 is returned to 1 and i+2 becomes 2. That is, for example, when i=2n in S2103, the control unit 101 may judge whether or not there is partial linearity for the pixel values $p_{2n}$, $p_1$, and $p_2$ of the patches that have the patch identifiers a2n, a1, and a2, respectively.

When there is no partial linearity (No in S2103), the flow proceeds to S2104. In S2104, the control unit 101 sets the value of parameter j to 0. In S2105, the control unit 101 increases the value of parameter i by one. In S2106, the control unit 101 judges whether or not the value of parameter i agrees with 2n, which is the number of patches of the patch group information 2000. When the value of parameter i is not 2n, which is the number of patches of the patch group information 2000 (No in S2106), the flow returns to S2103. On the other hand, when the value of parameter i is 2n, which is the number of patches of the patch group information 2000 (Yes in S2106), this operation flow is terminated and the flow proceeds to S1202 in FIG. 12.

On the other hand, when there is partial linearity in S2103 (Yes in S2103), the flow proceeds to S2107. In S2107, the control unit 101 judges whether or not the value of parameter j is 0. When the value of parameter j is 0, (Yes in S2107), the flow proceeds to S2108. In S2108, the control unit 101 judges whether or not the pixel value $p_i$ is greater than the pixel value $p_{i+1}$. When the pixel value $p_i$ is greater than the pixel value $p_{i+1}$ (Yes in S2108), the flow proceeds to S2109, the control unit 101 sets k=0, and the flow proceeds to S2111. On the other hand, when the pixel value $p_i$ is equal to or less than the pixel value $p_{i+1}$ (No in S2108), the flow proceeds to S2110, the control unit 101 sets k=1, and the flow proceeds to S2111. Here, when the value of parameter k is 0, this indicates that the fluctuation direction of the pixel values in the partial linearity that has been detected in S2103 is a decreasing direction. When the value of parameter k is 1, this indicates that the fluctuation direction of the pixel value in the partial linearity that has been detected in S2103 is an increasing direction. In S2111, the control unit 101 increases the value of parameter j by one, and the flow proceeds to S2105. In the operation flow in FIG. 21, parameter j is used, for example, as a parameter for counting the number of consecutive pieces of partial linearity that have the same fluctuation direction of the pixel values.

When the value of parameter j is not 0 in S2107, (No in S2107), the flow proceeds to S2112. In S2112, the control unit 101 judges whether or not the pixel value $p_i$ is greater than the pixel value $p_{i+1}$. When the pixel value $p_i$ is greater than the pixel value $p_{i+1}$ (Yes in S2112), the flow proceeds to S2113. In S2113, the control unit 101 judges whether or not the value of parameter k is 0. When the value of parameter k is not 0 (No in S2113), the flow returns to S2104. On the other hand, when the value of parameter k is 0 (Yes in S2113), the flow proceeds to S2115.

In S2112, when the pixel value $p_i$ is equal to or less than the pixel value $p_{i+1}$ (No in S2112), the flow proceeds to S2114. In S2114, the control unit 101 judges whether or not the value of parameter k is 1. When the value of parameter k is not 1 (No in S2114), the flow returns to S2104. On the other hand, when the value of parameter k is 1 (Yes in S2114), the flow proceeds to S2115. In S2115, the control unit 101 increases the value of parameter j by one, and the flow proceeds to S2116. In S2116, the control unit 101 judges whether or not the value of parameter j is n−1. When the value of parameter j is not n−1 (No in S2116), the flow proceeds to S2105. On the other hand, when the value of parameter j is n−1 (Yes in S2116), the flow proceeds to S2117. The case in which the value of parameter j is n−1 indicates that n−1 consecutive sets of partial linearity all of which have the same magnitude relationship between the pixel value $p_i$ and the pixel value $p_{i+2}$ is detected. When the partial linearity is composed of three consecutive patches, n+1 patches are included in the section in which n−1 sets of partial linearity continue, and the section corresponds to the section between two patches in a pair in the color chart 2. Therefore, in S2117, the control section 101 may specify as a linear section the section in which the n−1 consecutive sets of partial linearity have been detected. When a length of three points or more, such as four points or five points, is used as a length for detecting partial linearity in S2103, the number of consecutive pieces of partial linearity that are included in the section of n+1 patches changes. As a result, the value that is used for a judgment in S2116 may be changed from n−1 according to the length of the partial linearity. In another example, in the judgment in S2116, the control unit 101 may judge, for example, whether or not the number of patches that are included in j consecutive pieces of partial linearity is n+1.

In S2117, the control unit 101 increases the value of parameter l by one, and sets the value of parameter j to 0. Next, in S2118, the control unit 101 stores the linear section of the patches, and the flow returns to S2105. For example, the control unit 101 may store in the storage unit 102 as a linear section the patches that are included in the n−1 sets of partial linearity for which it has been determined in S2103 that there is partial linearity in the range from j=1 to j=n−1.

As described above, in the operation flow in FIG. 21, the control unit 101 selects, for example, from the 2n patches of the same color that are included in the color chart 2, three clockwise consecutive patches around the area in which the subject, which is the correction target, is imaged. The three consecutive patches that are selected here are shifted, for example, clockwise by one every time the value of i increases by one in S2105. Then, the control unit 101 judges whether or not there is partial linearity in the selected three consecutive patches (S2103). When there is partial linearity, in the processes in S2107-S2111, the control unit 101 acquires, as the value of k, the fluctuation direction of the pixel values in the detected partial linearity. Then, in the processes in S2112-S2116, the control unit 101 judges whether or not the fluctuation direction of the pixel values that have been acquired as the value of k agrees with that in the next partial linearity that has been detected by increasing the value of i by one. When the fluctuation direction of the pixel values agrees with that in the next partial linearity, the control unit 101 increases the value of j by one. By repeating the process, the control unit 101 counts, as the value of parameter j, the number of consecutive pieces of partial linearity in which the fluctuation directions of the pixel values are the same (S2111 and S2115). When n−1 sets of the partial linearity in which the fluctuation directions of the pixel values are the same continue, the control unit 101 specifies as a linear section the section in which the n−1 sets of the partial linearity continue, and counts the number of linear sections as the value of 1 (S2117). In addition, the control unit 101 stores the patches that are included in the specified linear section in the storage unit 102 (S2118).

As a result, when the color chart 2 has three or more pairs of patches of the same color that are arranged point-symmetrically with respect to the symmetric point 30, the control unit 101 may acquire the number of linear sections by specifying the linear sections by means of the linear section specifying process according to the second embodiment in FIG. 21.

Next, in the process in S1202 and thereafter in FIG. 12, the control unit 101 may specify according to the acquired linear section the patch that has the pixel value that corresponds to the sinusoidal function from among the 2n patches of the same color. Meanwhile, the control unit 101 may detect according to the linear section that has been specified from the pixel values of the 2n patches of the same color, that the partial illumination environment change 50 has occurred in one of the 2n patches of the same color.

For example, in S1203, when two linear sections that do not overlap with each other are specified, the control unit 101 may specify all of the 2n patches of the same color as patches that have pixel values that correspond to the sinusoidal function. In this case, the control unit 101 may judge that the partial illumination environment change 50 has not occurred in all the 2n patches of the same color. As a result, the control unit 101 may reproduce the pixel value that the subject originally has by acquiring in S1204 and S1205 a representative value from the pixel values of the 2n patches of the same color and by correcting the pixel values with reference to the acquired representative value.

For example, in S1207, when there is one linear section, the control unit 101 may specify as patches that have pixel values that correspond to the sinusoidal function n+1 patches of the same color that are included in the one linear section. In addition, the control unit 101 may detect that the patch in which the partial illumination environment change 50 has occurred is included in the remaining patches of the same color that are not included in the one linear section from among the 2n patches of the same color. As a result, the control unit 101 may exclude the remaining patches in which the partial illumination environment change 50 may have occurred when the pixel values are corrected. Then, in S1208, the control unit 101 acquires the representative value from among the pixel values of the n+1 patches of the same color that are included in the one linear section, and in S1205, the control unit 101 corrects the pixel value of the image with reference to the representative value. Thus, the control unit 101 may exclude the patch in which the partial illumination environment change 50 has occurred when correcting the pixel values, and may execute correction. Therefore, the pixel value that the subject originally has may be reproduced.

In addition, for example, when there are no linear sections in S1207, the control unit 101 may prompt the user to capture an image again by outputting error information in S1206. The user may capture images until an image for which pixel value correction is likely to be successful is captured. As a result, the user may acquire an image in which the pixel value that the subject originally has has been reproduced.

In S1208, for example, the control unit 101 may use as the representative value the pixel value of the patch that is positioned in the middle of the n+1 consecutive patches that are included in the one detected linear section. Alternatively, since both end patches of the patches that are included in the one detected linear section form a pair, the control unit 101 may use as the representative value an average value such as the arithmetic average or the weighted average of the pixel values of both end patches. Alternatively, the control unit 101 may use as the representative value an average value such as the arithmetic average or the weighted average of the pixel values of n+1 consecutive patches that are included in the one detected linear section. The calculation of the representative value is not limited to this, and for example, the pixel value of the patch in the center of the area in which the subject, which is the correction target, is imaged may be estimated by using another calculation method, and the acquired value may be used as the representative value.

In the above first and second embodiments, linear fluctuation of the pixel values of clockwise or counterclockwise consecutive patches of the same color around the area in which the subject is imaged is detected by means of Formula A1. However, the embodiments are not limited to this, and linear fluctuation of the pixel values of clockwise or counterclockwise consecutive patches of the same color around the area in which the subject is imaged may be detected by means of another judgment technique. For example, in another embodiment, the center of the area in which the subject is imaged is set to be the symmetric point 30, a rotation angle from a patch to another patch, the patches existing around the symmetric point 30, is plotted on the horizontal axis and a pixel value of a patch is plotted on the vertical axis. In this case, linear fluctuation may be detected by judging whether or not the pixel values of the clockwise or counterclockwise consecutive patches around the symmetric point 30 are on a straight line within a prescribed error range.

In addition, in the first embodiment and the second embodiment, the color chart 1 that is illustrated in FIG. 2 and the color chart 2 that is illustrated in FIGS. 14-19 are used as examples, respectively. However, color charts that maybe used in the first embodiment and the second embodiment are not limited to these.

For example, in the color chart 1 that is illustrated in FIG. 2 and the color chart 2 that is illustrated in FIGS. 14-19, patches of the same color are arranged at angles of equal intervals around the area in which the subject is imaged. Since intervals for arranging the patches correspond to intervals at which the patches are positioned on the horizontal axis of the sinusoidal curve in FIG. 4B, extremely uneven distribution of the patches may affect a judgment on a linear section or partial linearity which is made by using, for example, Formula A1. Thus, it is preferable that patches of the same color are arranged at equal intervals around the area in which the subject is imaged. However, patch intervals may be optionally changed within a range for which a linear section may be specified by detecting linear fluctuation of pixel values from consecutive patches of the same color around the area in which the subject is imaged, for example, by means of a judgment that uses Formula A1 or another judgment technique.

For example, in the color chart 1 that is illustrated in FIG. 2 and the color chart 2 that is illustrated in FIGS. 14-19, a pair of patches of the same color are point-symmetrically arranged. Point-symmetric arrangement of a pair of patches of the same color is preferable because effects of gradation will be easily eliminated, for example, by the arithmetic average of the pixel values of the pair of patches. However, a pair of patches may be arranged, for example, on both sides across the center of the area in which the subject, which is a correction target, is imaged, at different distances from the center. Even in this case, the pixel value of the patch in the center of the area in which the subject is imaged may be estimated by eliminating effects of gradation by weighing the pixel values of the pair of patches, for example, according to the distances to the patches from the center of the area in which the subject is imaged.

As described above, the pixel values of patches correspond to a sinusoidal curve when gradation has been generated in an image, because it is assumed that the patches are arranged in a concentric circle in the image. Therefore, for example, when the patches are arranged so that the distances to the patches from the center of the area in which the subject is imaged are different from one other, deviations from the sinusoidal curve occur in the pixel values of the patches. Thus, it is preferable that each of the patches of the same color is arranged on a concentric circle. However, the patches maybe arranged so that the distances to the patches from the center of the area in which the subject is imaged are different within a range for which a linear section may be specified by detecting, for example, by means of a judgment that uses Formula A1 or another judgment technique, linear fluctuation of the pixel values from the consecutive patches of the same color around the center of the area in which the subject is imaged. Therefore, a pair of patches of the same color may be arranged on the color chart, for example, at distances that are shorter than the average distance from the subject and that are different from each other. The difference in distance may be set so that the difference is within the range for which a linear section may be specified by means of a judgment that uses the above Formula A1 or by means of another judgment technique on the basis of the pixel values of the patches of the same color.

In the above operation flow in FIG. 21, in the processes in S2101-S2118 the control unit 101 of the image processing device 100 functions, for example, as the specifying unit 111.

Third Embodiment

Figure 22:
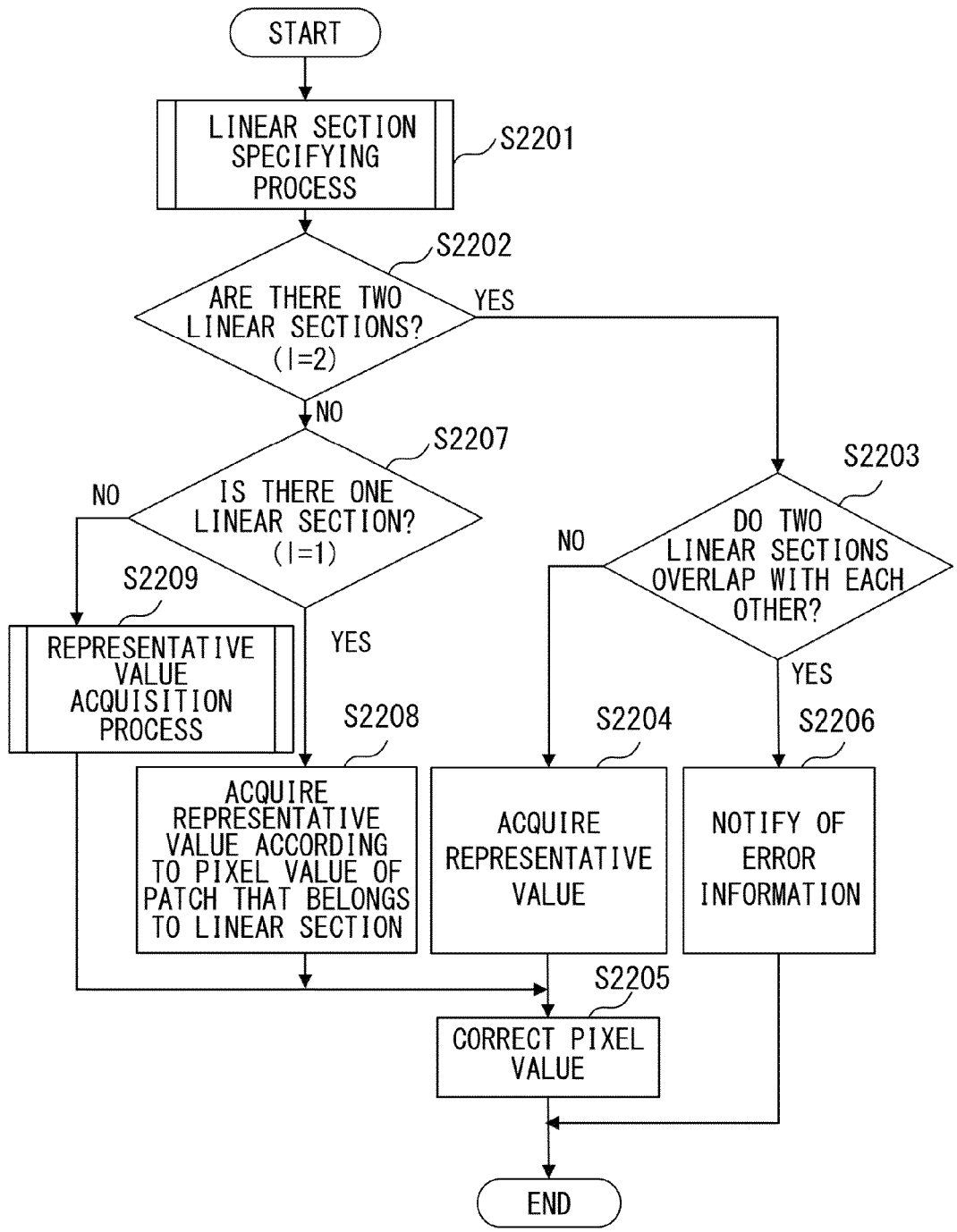
FIG. 22 is a diagram illustrating a pixel value correction process according to a third embodiment.
Figure 23:
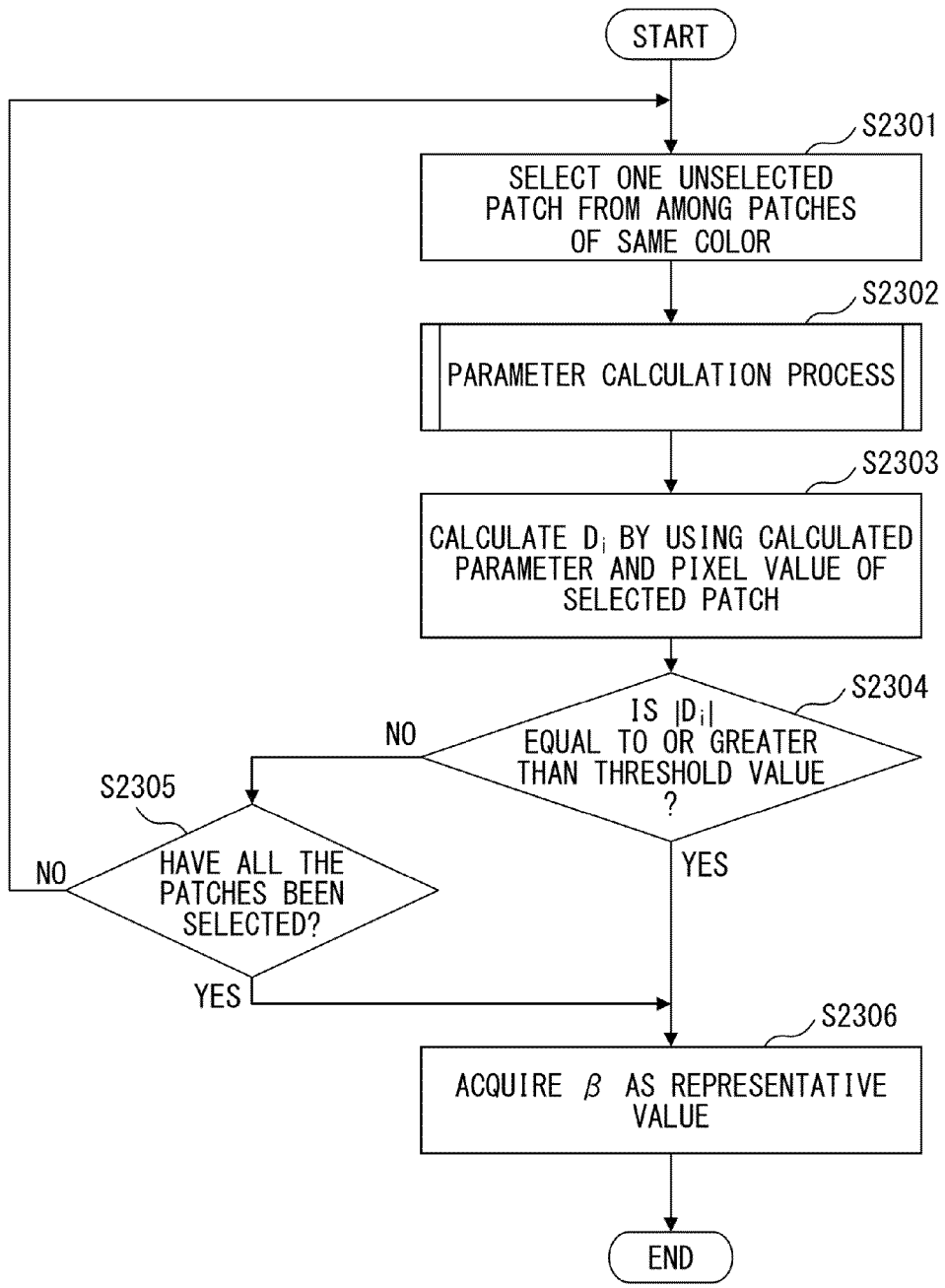
FIG. 23 is a diagram illustrating an operation flow of a representative value acquisition process according to the third embodiment.

FIGS. 22 and 23 are diagrams explaining a third embodiment. When the number of patches of the same color that are arranged around the area in which the subject is imaged in the color chart is a certain number or greater, it is possible to acquire information related to the curve of the sinusoidal function that is expressed by Formula 1 from the detected pixel values of the patches. Therefore, according to the detected pixel values of the patches, reliable values of $\alpha$, $\beta$, and $\theta_0$ with respect to, for example, Formula 1 may be estimated. In Formula 1, since $\beta$ is the pixel value in the vibration center of the sinusoidal function (FIG. 4B), $\beta$ may be used as a reference for correction of a pixel value of the image. Therefore, in the third embodiment, the control unit 101 calculates the value of $\beta$ according to the pixel values of the plurality of patches of the same color in the color chart which are arranged around the area in which the subject is imaged, and corrects the pixel value of the image with reference to the acquired value of $\beta$. In this estimation, the number of the patches of the same color may be, for example, 4 or greater, and preferably, 8 or greater. In the third embodiment, examples of the color chart include the color chart 1 and the color chart 2.

First, the values of $\alpha$, $\beta$, and $\theta_0$ may be calculated as follows. As described above, for example, FIG. 4A illustrates a case in which a change in the illumination environment due to gradation has occurred so that the illumination environment becomes gradually brighter in the direction 20 in the image. In this case, it is assumed that on the circle with radius r from the point P, for example, the point 41 is a point at 0 degrees of the angle $\theta$. It is assumed that $\theta_0$ is the rotation angle from the point 41 to the direction 20 that indicates the gradation direction (that is, $\theta_0$ represents the gradation direction). In this case, the pixel value y of a point may be expressed, for example, by the following Formula 1, the point being obtained by rotating by the angle $\theta$ on the circumference of the circle with radius r from the point P. In the following Formula 1, the positive direction of $\theta$ is the counterclockwise rotation direction in FIG. 4A, and $\beta$ is the value of the vibration center of the sinusoidal curve, and corresponds to the pixel value at the point P.

$$y = \alpha \cos(\theta - \theta_0) + \beta \quad \text{[Formula 1]}$$

Here, when the index of each of the patches of the same color that are arranged around the area in which the subject is imaged is expressed as i (i=1 to n) and the angle of each patch from the point 41 is expressed as $x_i$, the theoretical value $y'_i$ of the pixel value of patch i may be expressed by the following formula that is obtained from Formula 1. The angle $x_i$ of each patch from the point 41 may be stored, for example, as a table in the storage unit 102. Alternatively, in another embodiment, for example, when the patches are arranged at equal intervals, the angle $x_i$ of each patch may be calculated according to the arrangement interval.

$$y'_i = \alpha \cos(x_i \theta_0) + \beta \quad \text{[Formula 2]}$$

Here, it is assumed that patch i=m is a patch in which the partial illumination environment change 50 has occurred. In this case, it is estimated that the actual measured value $y_i$ of the pixel value of patch m will be a value that deviates from the theoretical value $y'_i$; however, it is predicted that the actual measured value $y_i$ of the pixel value of another patch will be a value that is close to the theoretical value $y'_i$. Therefore, the control unit 101 calculates as values that minimize the evaluation function of the following Formula 3 $\alpha$-hat, $\beta$-hat, and $\theta_0$-hat, which are estimated values of $\alpha$, $\beta$, and $\theta_0$, by using the pixel values of the patches excluding patch m.

$$J = \sum_{\substack{i=1 \\ i \neq m}}^{n} (y_i - y'_i)^2 \quad \text{[Formula 3]}$$

First, Formula 4 is obtained by modifying Formula 3 by Formula 2.

$$J = \sum_{\substack{i=1 \\ i \neq m}}^{n} (y_i - \alpha \cos(x_i - \theta_0) - \beta)^2 \quad \text{[Formula 4]}$$

In Formula 4, since $y_i$ is the actual measured value of the pixel value of patch i, $y_i$ is a value that may be obtained from the image.

In Formula 4, when J is partially differentiated by $\beta$ and the result is set to 0, and then the formula is solved for $\beta$, the following Formula 5 is obtained.

$$\hat{\beta} = \frac{1}{n-1} \sum_{\substack{i=1 \\ i \neq m}}^{n} (y_i - \hat{\alpha}\cos(x_i - \hat{\theta}_0)) \qquad \text{[Formula 5]}$$

In Formula 4, when J is partially differentiated by $\alpha$ and the result is set to 0, and then the formula is solved for $\alpha$, the following Formula 6 is obtained.

$$\hat{\alpha} = \frac{\sum_{\substack{i=1 \\ i \neq m}}^{n} (y_i - \hat{\beta})}{\sum_{\substack{i=1 \\ i \neq m}}^{n} \cos(x_i - \hat{\theta}_0)} \qquad \text{[Formula 6]}$$

In Formula 4, when J is partially differentiated by $\theta_0$ and the result is set to 0, the following Formula 7 is obtained.

$$\sum_{\substack{i=1 \\ i \neq m}}^{n} (y_i - \hat{\alpha}\cos(x_i - \hat{\theta}_0) - \hat{\beta})\hat{\alpha}\sin(x_i - \hat{\theta}_0) = 0 \qquad \text{[Formula 7]}$$

Here, with respect to Formula 7, the control unit 101 obtains the solution of $\theta_0$-hat by using Newton's method, which is an iterative solution technique. In Newton's method, the solution is obtained according to the following update formula (Formula 8).

$$\hat{\theta}_0^{(t+1)} = \hat{\theta}_0^{(t)} - \frac{f(\hat{\theta}_0^{(n)})}{f'(\hat{\theta}_0^{(n)})} \qquad \text{[Formula 8]}$$

In Formula 8, t is an iteration count. In Formula 8, $$f(\hat{\theta}_0) = \sum_{\substack{i=1 \\ i \neq m}}^{n} (y_i - \hat{\alpha}\cos(x_i - \hat{\theta}_0) - \hat{\beta})\hat{\alpha}\sin(x_i - \hat{\theta}_0) \qquad \text{[Formula 9]}$$

In Formula 8, $$f'(\hat{\theta}_0) = \frac{\partial}{\partial \hat{\theta}_0} f(\hat{\theta}_0) \qquad \text{[Formula 10]}$$

When $\theta_0$-hat is obtained by using Formula 8, $\alpha$-hat and $\beta$-hat are necessary. Therefore, in one embodiment, the control unit 101 obtains the maximum value and the minimum value of the pixel values of the detected patches that have indexes 1 to n (excluding m). Then, the control unit 101 calculates ([the maximum value of the pixel values]−[the minimum value of the pixel values])/2, and uses the result as the initial value of $\alpha$-hat. The control unit 101 calculates ([the maximum value of the pixel values]+[the minimum value of the pixel values])/2, and uses the result as the initial value of $\beta$-hat.

After calculating $\theta_0$-hat in Formula 8, the control unit 101 substitutes the calculated value of $\theta_0$-hat and the calculated initial value of $\alpha$-hat into Formula 5, and obtains $\beta$-hat. In addition, the control unit 101 obtains $\alpha$-hat from Formula 6 by using the obtained $\beta$-hat and $\theta_0$-hat. Next, the control unit 101 calculates a new $\theta_0$-hat by means of Formula 8 by using the values of $\beta$-hat and $\alpha$-hat that have been obtained from Formula 5 and Formula 6, respectively. By repeating the above process until the values of $\theta_0$-hat, $\beta$-hat, and $\alpha$-hat converge, the control unit 101 may calculate parameters $\theta_0$-hat, $\beta$-hat, and $\alpha$-hat.

By using the obtained parameters $\theta_0$-hat, $\beta$-hat, and $\alpha$-hat, the control unit 101 may judge whether or not the partial illumination environment change 50 has occurred in patch i=m. For example, when the partial illumination environment change 50 has occurred in patch i=m, it is estimated that the actual measured value $y_i$ of the pixel value of patch m will be a value that deviates from the theoretical value $y'_i$. Therefore, the control unit 101 substitutes into the following Formula 11 the obtained parameters $\theta_0$-hat, $\beta$-hat, and $\alpha$-hat, and derives the residual error $D_i$ between the actual measured value $y_i$ and the theoretical value $y'_i$ with respect to patch m. $D_i$ represents the degree of fit of the actual measured value of the pixel value of the patch with respect to the theoretical value.

$$D_i = y_i - \hat{\alpha}\cos(x_i - \hat{\theta}_0) - \hat{\beta} \qquad \text{[Formula 11]}$$

Here, when the absolute value of $D_i$ is equal to or greater than a threshold value ThD, the control unit 101 may judge that the partial illumination environment change 50 has occurred in patch i=m. On the other hand, when the absolute value of $D_i$ is less than the threshold value ThD, the control unit 101 may judge that the partial illumination environment change 50 has not occurred in patch i=m. Therefore, by making the above judgment by sequentially shifting the position of patch m in which it is assumed that the partial illumination environment change 50 has occurred from patch 1 to patch n, the control unit 101 may specify the position of the patch in which the partial illumination environment change 50 has occurred. Since the value of $\beta$-hat that has been calculated by excluding patch m in which the partial illumination environment change 50 has occurred is considered as a probable value, the control unit 101 may use the value of $\beta$-hat as a reference for correcting a pixel value of the image.

The threshold value ThD maybe set according to, for example, the obtained value of $\alpha$-hat (that is, an amplitude). Here, in order to calculate the optimum parameter, it is preferable to use a threshold value that is as strict as possible so as to focus on fit. Therefore, the threshold value ThD may be set to, for example a value that is about 3-5% of 2$\alpha$. However, the value of the threshold value ThD is not limited to this, and for example, the threshold value ThD may be set to a value that is about 1-15% of 2$\alpha$. For example, when the illumination environment when a pixel value is corrected by using the color chart is determined to some extent, a threshold value that is determined by an evaluation environment etc. may be stored in advance in the storage unit 102 and may be used as the value of the threshold value ThD.

FIG. 22 is a diagram illustrating a pixel value correction process according to the third embodiment. The operation flow of the pixel value correction process in FIG. 22 is implemented, for example, by means of reading and execution by the control unit 101 of the program 120 that is stored in the storage unit 102. In one embodiment, the operation flow in FIG. 22 may be initiated when an execution instruction for the pixel value correction process is input to the control unit 101.

The processes in S2201-S2208 in FIG. 22 may correspond to, for example, the processes in S1201-S1208 in FIG. 12, respectively. That is, for example, in the processes in S2201-S2208, the control unit 101 may execute processes that are similar to the processes in S1201-S1208 in FIG. 12. For example, in S2201, the control unit 101 may execute the linear section specifying process, and may execute, for example, the linear section specifying process that is illustrated in FIG. 13 or FIG. 21.

In the operation flow in FIG. 22, in S2207, the control unit 101 judges whether or not the number of linear sections is one (that is, parameter l=1). When the number of linear sections is not one (No in S2207), the flow proceeds to S2209. In S2209, the control unit 101 executes a representative value acquisition process.

FIG. 23 is a diagram illustrating the operation flow of a representative value acquisition process according to the third embodiment. The operation flow of the representative value acquisition process in FIG. 23 is implemented by means of reading and execution by the control unit 101 of the program 120 that is stored in the storage unit 102. In one embodiment, when the flow proceeds to S2209 in FIG. 22, the representative value acquisition process in FIG. 23 is initiated.

In S2301, the control unit 101 selects one unselected patch from among the plurality of patches of the same color that are included in the color chart. In S2302, the control unit 101 executes the parameter calculation process. The patch that have been selected in S2301 is patch m, in which it is assumed that the above partial illumination environment change 50 has occurred, and the control unit 101 executes the parameter calculation process by using, for example, the pixel values of the plurality of patches of the same color other than the selected patch m.

FIG. 24 is a diagram illustrating the operation flow of a parameter calculation process according to the embodiment. The operation flow of the parameter calculation process in FIG. 24 is implemented, for example, by means of reading and execution by the control unit 101 of the program 120 that is stored in the storage unit 102. According to one embodiment, when the flow proceeds to S2302 in FIG. 23, the parameter calculation process in FIG. 24 is initiated.

In S2401, the control unit 101 calculates the initial value of α-hat. The control unit 101 acquires the maximum value and the minimum value of the pixel values of patches other than patch m that has been selected in S2301, for example, from among the plurality of patches of the same color that are included in the color chart. The control unit 101 calculates ([the maximum value of the pixel values]−[the minimum value of the pixel values])/2 from the acquired maximum pixel value and the acquired minimum pixel value, and may use the result as the initial value of α-hat. In S2402, the control unit 101 calculates the initial value of β-hat. For example, the control unit 101 calculates ([the maximum value of the pixel values]+[the minimum value of the pixel values])/2 from the maximum pixel value and the minimum pixel value that have been acquired in S2401, and may use the result as the initial value of β-hat.

In S2403, the control unit 101 repeats the calculation until Formula 8 has converged by using the calculated initial value of α-hat and the calculated initial value of β-hat, and calculates $\theta_0$-hat. In S2404, the control unit 101 calculates Formula 5 from the initial value of α-hat and $\theta_0$-hat that has been calculated in S2403, and calculates β-hat. In S2405, the control unit 101 calculates Formula 6 from β-hat that has been calculated in S2404 and $\theta_0$-hat that has been calculated in S2403, and calculates α-hat.

In S2406, the control unit 101 judges whether or not $\theta_0$-hat, α-hat, and β-hat have converged. For example, when the differences between the values of $\theta_0$-hat, α-hat, and β-hat that have been obtained when the process in S2406 was executed last time and the values of $\theta_0$-hat, α-hat, and β-hat that are obtained when the process is executed this time, respectively, are within a specified range, the control unit 101 may judge that the values of $\theta_0$-hat, α-hat, and β-hat have converged. When the values of $\theta_0$-hat, α-hat, and β-hat have not converged (No in S2406), the flow returns to S2403. In the second or later processes in S2403 and S2404, the control unit 101 executes the processes by using $\theta_0$-hat, α-hat, and β-hat that have been obtained in S2406. That is, in S2403, the control unit 101 repeats the calculation until Formula 8 has converged by using β-hat that was obtained when the process in S2404 was executed last time and α-hat that was obtained when the process in S2405 was executed last time, and obtains $\theta_0$-hat. In S2404, the control unit 101 obtains β-hat by using $\theta_0$-hat that has been obtained in S2403 and α-hat that was obtained when the process in S2405 was executed last time.

Then, when $\theta_0$-hat, α-hat, and β-hat have converged in S2406 (Yes in S2406), this operation flow is terminated, and the flow proceeds to S2303 in FIG. 23.

In S2303, the control unit 101 calculates Formula 11 by using the parameters $\theta_0$-hat, α-hat, and β-hat that have been calculated in S2302, and the pixel value of the patch that has been selected in S2301, and calculates $D_i$. In S2304, the control unit 101 judges whether or not the absolute value of $D_i$ is the threshold value ThD or greater. When the absolute value of $D_i$ is the threshold value ThD or greater (Yes in S2304), the flow proceeds to S2306. In this case, it is estimated that the patch that has been selected in S2301 is the patch in which the partial illumination environment change 50 has occurred. The parameters $\theta_0$-hat, α-hat, and β-hat, which have been calculated in S2303 by excluding the patch in which the partial illumination environment change 50 has occurred, have probable values.

Next, in S2306, the control unit 101 acquires the value of β-hat that has been calculated in S2302 as a representative value that represents the pixel values of the plurality of patches of the same color that are included in the color chart. When the control unit 101 acquires the representative value in S2306, this operation flow is terminated, the flow proceeds to S2205 in FIG. 22, and the control unit 101 corrects a pixel value of the image by using the specified representative value.

On the other hand, when the absolute value of $D_i$ is less than the threshold value ThD (No in S2304), the flow proceeds to S2305. In S2304, the case in which the absolute value of $D_i$ is less than the threshold value ThD in S2304 indicates that the patch that has been selected in S2301 is a patch that has a pixel value that corresponds to the sinusoidal function in Formula 1. In S2305, the control unit 101 judges whether or not all of the plurality of patches of the same color that are included in the color chart have been selected. When not all the patches have been selected (No in S2305), the flow returns to S2301, and the control unit 101 repeats the process by selecting another unselected patch.

On the other hand, when all the patches have been selected (Yes in S2305), the flow proceeds to S2306. The case in which all the patches have been selected indicates that there are no patches in which it is estimated in S2304 that the partial illumination environment change 50 has occurred. In this case, in S2306, the control unit 101 may acquire as the representative value the obtained parameter β, and may execute the following processes. Alternatively, in another example, the control unit 101 may calculate the representative value by averaging the pixel values of all the patches. In yet another example, a reliable β may not have been obtained, for example, when the patch in which it is estimated in S2304 that the partial illumination environment change 50 has occurred may not be specified even though the judgment is No in S2207 and there are no linear sections. Therefore, when all the patches have been selected (Yes in S2305), the flow may proceed to S2206.

As described above, in the third embodiment, the control unit 101 calculates the pixel value β at the vibration center of the sinusoidal function in FIG. 4B according to the pixel values of the plurality of patches of the same color, and uses the value as a reference for correcting the pixel value of the subject. Therefore, even in the case in which the partial illumination environment change 50 has occurred in a position in which the pixel value is highest or lowest in gradation, the case being described with reference to, for example, FIGS. 7, 8, 16, and 17, the pixel value that the subject originally has may be reproduced by correcting the pixel value.

In the above example, in S2301, the control unit 101 selects from among all the patches of the same color, patch m in which it is assumed that the partial illumination environment change 50 has occurred. However, for example, with respect to a patch for which it has been judged in S2103 of the linear section specifying process in FIG. 21 that there is partial linearity, the partial illumination environment change 50 is not likely to have occurred therein. Therefore, a patch for which it has been judged in S2103 that there is partial linearity may be excluded from selection targets in S2301. For example, since it has been judged that there is partial linearity in patches 1, 2, 3, 5, and 6 in FIG. 16A and patches 1, 2, 3, 4, 6, 7, and 8 in FIG. 16B, the patches may be excluded from selection targets in S2301. Then, the control unit 101 may select in S2301 patches such as patch 4 in FIG. 16A and patch 5 in FIG. 16B, in which partial linearity has not been detected, and may execute the following process in S2303. In this manner, the computing load of the representative value acquisition process may be reduced.

In the above operation flow in FIG. 22, in the processes in S2201-S2203, S2206, and S2207, the control unit 101 of the image processing device 100 functions, for example, as the specifying unit 111. In the processes in S2204, S2205, and S2208, the control unit 101 of the image processing device 100 functions, for example, as the correction unit 112. In the process in S2209, the control unit 101 of the image processing device 100 functions, for example, as the specifying unit 111 or the correction unit 112.

In the operation flow in FIG. 23, in the processes in S2301, S2303, S2304, and S2305, the control unit 101 of the image processing device 100 functions, for example, as the specifying unit 111. In the processes in S2302 and S2306, the control unit 101 of the image processing device 100 functions, for example, as the correction unit 112.

In the operation flow in FIG. 24, in the processes in S2401-S2406, the control unit 101 of the image processing device 100 functions, for example, as the correction unit 112.

Fourth Embodiment

As illustrated in FIG. 19, there is a case in which the partial illumination environment change 50 has occurred in one or more patches from among the plurality of patches of the same color on the color chart. A fourth embodiment enables acquisition of a representative value even when the partial illumination environment change 50 has occurred in one or more patches from among the plurality of patches of the same color on the color chart.

As a technique for calculating the value of β in a case in which the partial illumination environment change 50 has occurred in one or more patches from among the plurality of patches of the same color on the color chart, for example, a RANSAC (Random Sample Consensus) method may be used. When the RANSAC method is used, the control unit 101 obtains parameters α, β, and $θ_0$ by using, for example, some of the pixel values of the plurality of patches of the same color on the color chart. Then, the control unit 101 specifies as the estimated value of a parameter the parameter that has the greatest number of patches that have pixel values that follow the obtained parameter from among the plurality of patches of the same color on the color chart.

FIG. 25 is a diagram illustrating the operation flow of a representative value acquisition process according to the fourth embodiment. The operation flow of the representative value acquisition process in FIG. 25 is executed, for example, by means of reading and execution by the control unit 101 of the program 120 that is stored in the storage unit 102. In one embodiment, when the flow proceeds to S2209 in FIG. 22, the representative value acquisition process in FIG. 25 is initiated.

In S2501, the control unit 101 sets the value of the iteration parameter k to 0, initializing the iteration parameter k. In S2502, the control unit 101 sets the value of the counting parameter Wmax to 0, initializing the counting parameter Wmax. In S2503, the control unit 101 selects at random M patches from among the plurality of patches of the same color on the color chart. For example, M is an integer of three or greater.

In S2504, the control unit 101 executes a parameter calculation process by using the M patches that have been selected at random in S2503. The control unit 101 may execute the parameter calculation process illustrated in FIG. 24, for example, and calculate the values of parameters $θ_0$-hat, α-hat, and β-hat. In the parameter calculation process illustrated in FIG. 24, the above Formulas 5-10 are used. Here, in Formulas 5-10, i≠m, and patch m is excluded. However, in the fourth embodiment, a patch that has not been selected in S2503 is a patch to be excluded, and a parameter is calculated by using all of the M patches that have been selected in S2503. Therefore, in the parameter calculation process that is executed in S2504, it is assumed that patch m is not excluded due to the description i≠m in Formulas 5-10.

In S2505, the control unit 101 counts the number of patches that follow the calculated parameters $θ_0$-hat, α-hat, and β-hat by using Formula 11, and sets the counted number as W. For example, the control unit 101 substitutes into Formula 11 the calculated parameters $θ_0$-hat, α-hat, and β-hat. Then, the control unit 101 calculates $D_i$ by means of Formula 11 by using the pixel value in the image of each of the plurality of patches of the same color on the color chart. When the absolute value of $D_i$ is less than the threshold value ThD, the patch is counted as a patch that follows the parameters, and the counted number is set as W.

In S2506, the control unit 101 judges whether or not W is greater than Wmax. When W is equal to or less than Wmax (No in S2506), the flow proceeds to S2508. When W is greater than Wmax (Yes in S2506), the flow proceeds to S2507. In S2507, the control unit 101 sets the value of W to Wmax, and the control unit 101 stores in the storage unit 102 the patches that follow the parameters in S2505, and the value of parameter β that has been calculated in S2504. In S2508, the control unit 101 increases the value of the iteration parameter k by one. Next, in S2509, the control unit 101 judges whether or not the value of the iteration parameter k is less than Kmax. When the iteration parameter k is less than Kmax (Yes in S2509), the flow returns to S2503, and the control unit 101 newly selects M patches at random and repeats the process. On the other hand, when the iteration parameter k is equal to or greater than Kmax (No in S2509), the flow proceeds to S2510. Kmax is the repetition number in the RANSAC method. The value of Kmax may be set according to the number of patches of the same color that are included in the color chart and the number of patches that are selected at random in S2503, and for example, a value from several hundreds to several tens of thousands maybe set. For example, when the color chart includes 10 patches of the same color and four patches are selected at random in S2503 from among the patches of the same color, the number of combinations is 10×9×8×7=5040≈5000. As a result, Kmax may be set to 5000.

In S2510, the control unit 101 reads from the storage unit 102 the value of β when the value of W that has been set in Wmax has been obtained in S2505, and acquires the value as a representative value that represents the pixel values of the plurality of patches of the same color that are included in the color chart. A patch that follows a parameter when the value of W that is set in Wmax has been obtained in S2505 is a patch that has a pixel value that corresponds to the sinusoidal function of Formula 1. When the value of β is acquired as the representative value, this operation flow is terminated, and the flow proceeds to S2205 in FIG. 22. The control unit 101 corrects a pixel value of the image by using the acquired representative value.

As described above, in the fourth embodiment, for example, as illustrated in FIG. 19, even when the partial illumination environment change 50 has occurred in one or more patches from among the plurality of patches of the same color that are included in the color chart, the value of β may be calculated. Therefore, a representative value maybe obtained, the representative value representing the pixel values of the plurality of patches of the same color that are included in the color chart. Accordingly, for example, even when no linear sections are detected due to the occurrence of the partial illumination environment change 50, a pixel value of an area between patches of the same color in the image maybe corrected by using the obtained representative value. As a result, the pixel value that the subject originally has maybe reproduced.

In the above operation flow in FIG. 25, in the processes in S2501-S2503 and S2505-S2509, the control unit 101 of the image processing device 100 functions, for example, as the specifying unit 101. In the processes in S2504 and S2510, the control unit 101 of the image processing device 100 functions, for example, as the correction unit 112.

The above third and fourth embodiments describe an example in which, when in S2207 the judgment is NO and no linear sections have been specified, the control unit 101 executes the representative value acquisition process. However, the embodiments are not limited to this, and, for example, even in a case in which one or two linear sections are specified, a representative value may be obtained by the representative value acquisition process. Therefore, as a pixel value correction process according to a modification example of the third and fourth embodiments, the control unit 101 may execute the operation flow in FIG. 26.

Figure 26:
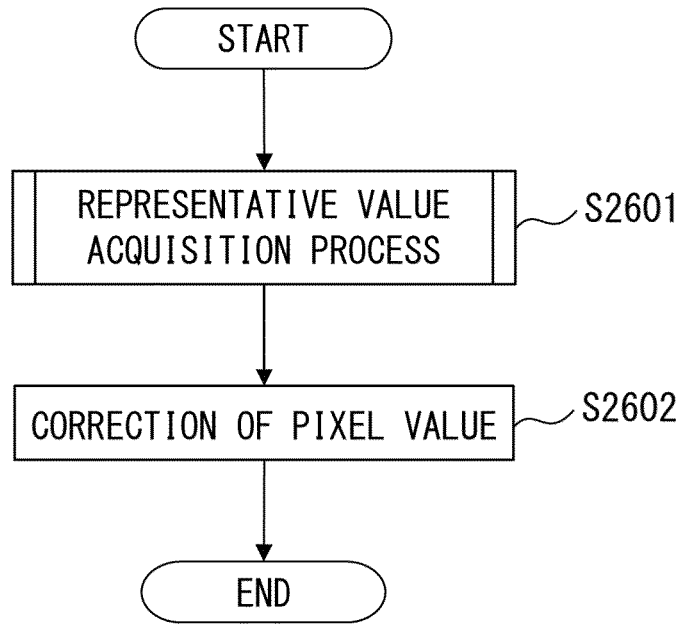
FIG. 26 is a diagram illustrating a pixel value correction process according to a modification example.

FIG. 26 is a diagram illustrating the operation flow of the pixel value correction process according to the modification example. The operation flow of the pixel value correction process in FIG. 26 is implemented, for example, by means of reading and execution by the control unit 101 of the program 120 that is stored in the storage unit 102. In one embodiment, when an execution instruction for the pixel value correction process is input to the control unit 101, the operation flow in FIG. 26 is initiated.

In S2601, the control unit 101 executes a representative value acquisition process. For example, in S2601, the control unit 101 executes the representative value acquisition process in FIG. 23 or 25, and acquires β, which is the pixel value at the vibration center of the sinusoidal function (FIG. 4B) as a representative value that represents the pixel values of the plurality of patches of the same color that are included in the color chart. In S2602, the control unit 101 corrects a pixel value of the image by using the acquired representative value, and this operation flow is terminated.

In the operation flow in FIG. 26, in the process in S2601, the control unit 101 of the image processing device 100 functions, for example, as the specifying unit 111 or the correction unit 112. In the process in S2602, the control unit 101 of the image processing device 100 functions as, for example, the correction unit 112.

In the pixel value correction process according to the above modification example, the control unit 101 may obtain a representative value that represents the pixel values of the plurality of patches of the same color that are included in the color chart, for example, in all of above cases 1, 3-5, and 7-8. Therefore, the control unit 101 may correct a pixel value by using the obtained representative value, and may reproduce the pixel value that the subject originally has.

In the above third and fourth embodiments and the modification example thereof, when β, which is used as the representative value, is obtained, a patch for which it has been judged that the absolute value of $D_i$ is less than the threshold value ThD by using Formula 11 may be considered as a patch that has a pixel value that corresponds to the sinusoidal function. As a result, the control unit 101 may specify a patch which is not affected by a non-uniform illumination environment change other than gradation from among the plurality of patches of the same color that are included in the color chart. On the other hand, when β, which is used as the representative value, is obtained, a patch for which it has been judged that the absolute value of $D_i$ is equal to or greater than the threshold value ThD by using Formula 11 in S2304 or S2505 may be considered as a patch in which the partial illumination environment change 50 has occurred. Therefore, the control unit 101 may detect that the partial illumination environment change 50 has occurred from the pixel values of the plurality of patches of the same color in the image, and may specify a patch in which the partial illumination environment change 50 has occurred.

The above third and fourth embodiments have been described by using the color chart 1 illustrated in FIG. 2 and the color chart 2 illustrated in FIGS. 14-19 as examples. However, the color chart is not limited to these.

For example, in the modification example of the third and fourth embodiments, a color chart such as the color chart 1 and the color chart 2 that may be used in the first and second embodiments may be used. In addition, a color chart may be used in the embodiments as long as patches of the same color are arranged approximately concentrically in the color chart, since information on the sinusoidal function may be obtained from the patch arrangement. Therefore, in the modification example of the third and fourth embodiments, for example, a color chart may be used in which patches of the same color are arranged so that the difference in distance from each patch to the subject is within the average distance from the subject to each of the paired patches. The difference in distance may be set to be within a range in which it is possible to judge by means of Formula 11 whether or not the patch has a pixel value that corresponds to the sinusoidal function in relation to the value that is set as the threshold value ThD in the above Formula 11.

In the above third and fourth embodiments and the modification example thereof, the sinusoidal function that is expressed as Formula 1 is used as an example. However, the function that may be used in the third and fourth embodiments and the modification example thereof is not limited to this. For example, a formula that is expressed by using a sine function etc. maybe used as long as the formula is a sinusoidal function that expresses fluctuation of pixel values due to gradation according to position. Similarly, for example, another function maybe used such as a function that expresses fluctuation of pixel values according to the position on an elliptical shape or a hexagonal shape in the image, as long as the function expresses fluctuation of pixel values due to gradation according to position. In this case, formulas that replace the above Formulas 2-11 are derived according to the function to be used, and the third and fourth embodiments and the modification example thereof may be implemented accordingly. In this case, a color chart may be used in which a plurality of patches are arranged so as to follow the shape that the function to be used expresses.

As described above, according to some embodiments, for example, when the partial illumination environment change 50 has occurred in some of the plurality of patches of the same color in an image, the control unit 101 may detect the occurrence thereof. In addition, in some embodiments, for example, when the partial illumination environment change 50 has occurred in some of the plurality of patches of the same color in the image, the control unit 101 may correct a pixel value of the image by excluding a patch in which the partial illumination environment change 50 has occurred. Thus, for example, even when the partial illumination environment change 50 has occurred in some of the plurality of patches of the same color in the image, the control unit 101 may reproduce the original pixel value of the subject by correcting a pixel value of the image. In addition, according to some embodiments, for example, when the partial illumination environment change 50 has occurred in some of the plurality of patches of the same color in the image, the control unit 101 may specify a patch in which the partial illumination environment change 50 has occurred.

In the above embodiments, the pixel value may be, for example, a luminance value or a color value. The color value may be, for example, the value of each color component in a color space. When an RGB space, in which red, green, and blue are set as primary colors, is used, the pixel value may be, for example, a component value of each of red, green, and blue. In some of the above embodiments, for example, when the color value is used, the control unit 101 may execute the processes according to some embodiments by using one of the colors that are components of the color space. Alternatively, the control unit 101 may execute the processes according to some embodiments by using a plurality of colors that are components of the color space.

In the above embodiments, several examples have been described with respect to calculation of the representative value that is used as a reference when a pixel value of the image is corrected. However, calculation of the representative value is not limited to this. For example, another technique maybe used as long as the technique enables estimation of a pixel value of a patch in the position of the subject in the image from a patch of the same color that has a pixel value that corresponds to the function that expresses fluctuation of pixel values due to gradation according to position. For example, in the above third and fourth embodiments and the modification example thereof, when the partial illumination environment change 50 has occurred in a patch of the same color, the patch is specified. Therefore, the representative value may be calculated by, instead of using β, for example, averaging the pixel values of a patch in which the partial illumination environment change 50 has occurred and the pixel values of the remaining patches, excluding the pixel value of a patch that is paired with the patch. In addition, in the above third and fourth embodiments and the modification example, a case in which the calculated value of β is used as the representative value is exemplified; however, the embodiments are not limited to this. In one embodiment, the control unit 101 may use as the representative value a value that is obtained according to the calculated β, and that is different from β. That is, for example, the control unit 101 may calculate the pixel value of the vibration center (β) of the sinusoidal function, and may correct a pixel value of the image according to the pixel value of the vibration center.

The above operation flows in FIGS. 12, 13, 21, 22, 23, 24, 25, and 26 are examples, and the embodiments are not limited to these. For example, when possible, the operation flow may be executed by changing the order of processes, an additional different process may be included, or some processes maybe omitted. For instance, in another embodiment, the processes in S1304 and S1305 in FIG. 13 may be executed by optionally reversing the order thereof; the processes in S2117 and S2118 in FIG. 21 may be executed by optionally reversing the order thereof; the processes in S2404 and S2405 in FIG. 24 may be executed by optionally reversing the order thereof; and the processes in S2501 and S2502 in FIG. 25 may be executed by optionally reversing the order thereof.

As described above, according to some embodiments even when non-uniformity of the illumination environment that limitedly fluctuates the pixel values of some of the plurality of patches has occurred in the image, the pixel value that the subject originally has may be reproduced.

FIG. 27 is a diagram illustrating a hardware configuration of a computer 2700 for realizing the image processing device 100 according to one embodiment. A computer 2700 illustrated in FIG. 27 includes, for example, a processor 2701, a memory 2702, a storage 2703, a reader 2704, a communication interface 2706, and an input and output device 2707. The processor 2701, the memory 2702, the storage 2703, the reader 2704, the communication interface 2706, and the input and output device 2707 are connected to one another, for example, via a bus 2708.

The processor 2701 provides some or all of the functions of each above function unit by executing the program 120 in which the procedures of, for example, the above operation flows are described by using the memory 2702. For example, the control unit 101 of the image processing device 100 is the processor 2701, and the storage 102 includes, for example, the memory 2702, the storage 2703, and a computer-readable recording medium 2705. The processor 2701 may function as the specifying unit 111 and the correction unit 112, for example, by reading and executing the program 120 from the storage 2703. The storage 2703 may store the program 120 and information such as patch group information 1100 and 2000.

An example of the memory 2702 is a semiconductor memory, and the memory 2702 is configured by including a RAM area and a ROM area. RAM is an abbreviation for Random Access Memory. ROM is an abbreviation for Read Only Memory. Examples of the storage 2703 include a semiconductor memory such as a hard disk and a flash memory, and an external storage.

The reader 2704 accesses the computer-readable recording medium 2705 in accordance with instructions from the processor 2701. The computer-readable recording medium 2705 is realized, for example, by a semiconductor device (USB memory, SD memory card, etc.), a medium to and from which information is input and output by a magnetic action (magnetic disk, etc.), and a medium to and from which information is input and output by an optical action (CD-ROM, DVD, etc.). USB is an abbreviation for Universal Serial Bus. CD is an abbreviation for Compact Disc. DVD is an abbreviation for Digital Versatile Disk.

The communication interface 2706 may be a communication apparatus such as a wireless LAN communication apparatus, an NFC communication apparatus, or an infrared communication apparatus. LAN is an abbreviation for Local Area Network. For example, the communication interface 2706 may transmit and receive data via a network 2720 in accordance with instructions from the processor 2701. Examples of the input and output device 2707 may include a device such as an input key and a touch panel that receive instructions from a user, and an imaging device configured to input image data. An example of the imaging device may be a camera that uses a CCD (Charge Coupled Device), a CMOS (Complementary Metal Oxide Semiconductor), etc. Examples of the input and output device 2707 may include a display device such as a display, and a speech device such as a loudspeaker. For example, an image in which a color chart is captured may be input from the input and output device 2707 such as the imaging device. Alternatively, an image in which a color chart is captured may be stored in the storage 2703 or may be acquired via the network 2720 or the computer-readable recording medium 2705.

Each program according to the embodiments is provided to the image processing device 100, for example, in the following forms:

(1) installed in advance in the storage 2703;
(2) provided by the computer-readable recording medium 2705;
(3) provided from the server 2730 such as a program server.

It should be understood by a person skilled in the art that some embodiments including the embodiments hereinbefore described include various modifications and substitutions for the above embodiments. For example, various embodiments may be embodied by modifying constituents. Various embodiments may be implemented by appropriately combining a plurality of constituents that have been disclosed in the above embodiments. Various embodiments may be further implemented by deleting or replacing some of the constituents that are described in the embodiments, or adding some constituents to the constituents that are described in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing device comprising:
   a processor configured to execute a process including
      extracting a pixel value of each of a plurality of areas of a same color that are arranged at different positions on a color chart that is captured in an image, and specifying by using the extracted pixel values of the areas and arrangement positions of the areas of the same color an area that has a pixel value that corresponds to a function that expresses fluctuation of pixel values according to a position due to non-uniformity of an illumination environment that fluctuates the pixel values at a constant rate in one direction, and
      correcting a pixel value of a correction target area between the areas of the same color according to the pixel value of the specified area.

2. The image processing device according to claim 1, wherein the plurality of areas of the same color are arranged on an outer circumference of the correction target area, and a relationship of pixel values of the same color is expressed by a sinusoidal function.

3. The image processing device according to claim 2, wherein
   the plurality of areas of the same color are two or more pairs of areas of the same color that are arranged in pairs on both sides across the correction target area, and wherein
   the processor executes a process comprising:
      judging whether or not pixel values of areas of the same color that exist in a section from one of the pair of areas of the same color to the other area of the same color linearly fluctuate, and judging the section to be a linear section when the pixel values of areas of the same color that exist in the section linearly fluctuate; and
      specifying the area that has the pixel value that corresponds to the sinusoidal function according to a number of the linear sections.

4. The image processing device according to claim 3, wherein
   the processor specifies when there is one linear section an area of the same color that is included in the one linear section as the area that has the pixel value that corresponds to the sinusoidal function.

5. The image processing device according to claim 3, wherein
   the processor judges when there are two linear sections whether or not there is an overlapping section in the two linear sections, and when there are no overlapping sections in the two linear sections, specifies an area of the same color that is included in the two linear sections as the area that has the pixel value that corresponds to the sinusoidal function.

6. The image processing device according to claim 2, wherein
   the processor specifies the area that has the pixel value that corresponds to the sinusoidal function according to a degree of fit when the extracted pixel values of the plurality of areas of the same color are applied to the sinusoidal function.

7. The image processing device according to claim 6 wherein,
   the processor calculates a pixel value of a vibration center of the sinusoidal function according to a pixel value of the area that has the pixel value that corresponds to the sinusoidal function and that is specified according to the degree of fit, and corrects the pixel value of the correction target area between the areas of the same color according to the pixel value of the vibration center.

8. An image processing method that is executed by a computer, the image processing method comprising:
   extracting, by the computer, a pixel value of each of a plurality of areas of a same color that are arranged at different positions on a color chart that is captured in an image and specifying, by the computer and by using the extracted pixel values of the areas and arrangement positions of the areas of the same color, an area that has a pixel value that corresponds to a function that expresses fluctuation of pixel values according to a position due to non-uniformity of an illumination environment that fluctuates the pixel values at a constant rate in one direction, by the computer; and correcting, by the computer, a pixel value of a correction target area between the areas of the same color according to the pixel value of the specified area.

9. A non-transitory computer-readable recording medium having stored therein a program for causing a computer to execute a process comprising:

extracting a pixel value of each of a plurality of areas of a same color that are arranged at different positions on a color chart that is captured in an image, and specifying by using the extracted pixel values of the areas and arrangement positions of the areas of the same color an area that has a pixel value that corresponds to a function that expresses fluctuation of pixel values according to a position due to non-uniformity of an illumination environment that fluctuates the pixel values at a constant rate in one direction; and correcting a pixel value of a correction target area between the areas of the same color according to the pixel value of the specified area.

* * * * *